US012148373B2

(12) United States Patent
Chae et al.

(10) Patent No.: US 12,148,373 B2
(45) Date of Patent: Nov. 19, 2024

(54) DISPLAY DEVICE

(71) Applicant: Samsung Display Co., Ltd., Yongin-si (KR)

(72) Inventors: Se Byung Chae, Yongin-si (KR); Weon Jun Choe, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/735,990

(22) Filed: May 3, 2022

(65) Prior Publication Data

US 2022/0358881 A1 Nov. 10, 2022

(30) Foreign Application Priority Data

May 4, 2021 (KR) ........................ 10-2021-0058146

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01);
(Continued)

(58) Field of Classification Search
CPC ............... G09G 3/3233; G09G 3/2007; G09G 2300/0819; G09G 2300/0842;
(Continued)

(56) References Cited

U.S. PATENT DOCUMENTS 8,797,311 B2 8/2014 Kim
2006/0001620 A1* 1/2006 Choi .................... G09G 3/3233 345/76

(Continued)

FOREIGN PATENT DOCUMENTS

KR 10-2011-0024099 3/2011
KR 10-1286515 7/2013
KR 10-2018-0003790 1/2018

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*

*Primary Examiner* — Jeff Piziali
(74) *Attorney, Agent, or Firm* — CANTOR COLBURN LLP

(57) ABSTRACT

A display device includes a display panel, a scan driver, a data compensator, and a data driver. The display panel includes a first area and a second area distinguished from each other along a scan direction. Each of the first and second areas include pixels. The scan driver is configured to sequentially provide scan signals to the display panel along the scan direction. The data compensator is configured to: detect a pattern in which a difference between adjacent grayscale values in image data is greater than a reference value; and generate compensated image data by compensating for grayscale values corresponding to the second area in the image data based on the pattern corresponding to the first area. The data driver is configured to: generate data signals based on the compensated image data; and provide the data signals to the display panel.

13 Claims, 14 Drawing Sheets

(52) U.S. Cl.
CPC ............... *G09G 2300/0842* (2013.01); *G09G 2310/0291* (2013.01); *G09G 2310/08* (2013.01); *G09G 2320/0233* (2013.01)

(58) Field of Classification Search
CPC ....... G09G 2310/0291; G09G 2310/08; G09G 2320/0233; G09G 3/3266; G09G 2300/0861; G09G 2320/0219; G09G 2320/0238; G09G 2320/0242; G09G 2320/0257; G09G 2320/0271; G09G 2320/0686; G09G 2340/0435; G09G 3/3225; G09G 3/3275; G09G 2300/0876
See application file for complete search history.

(56) References Cited

U.S. PATENT DOCUMENTS

| | | | | |
|---|---|---|---|---|
| 2008/0284719 A1* | 11/2008 | Yoshida | G02F 1/13392 | 349/37 |
| 2009/0129698 A1* | 5/2009 | Wang | G09G 3/3611 | 345/87 |
| 2010/0328339 A1* | 12/2010 | Cho | G09G 3/3426 | 345/589 |
| 2011/0007102 A1* | 1/2011 | Ogura | G09G 3/3291 | 345/690 |
| 2012/0092388 A1* | 4/2012 | Kamon | G09G 3/3426 | 345/88 |
| 2012/0127191 A1* | 5/2012 | Choi | G09G 3/3648 | 345/589 |
| 2014/0320479 A1* | 10/2014 | Kaneko | G09G 3/3648 | 345/212 |
| 2015/0170607 A1* | 6/2015 | Shin | G09G 3/3406 | 345/690 |
| 2016/0351101 A1* | 12/2016 | Lee | G09G 3/3225 | |
| 2017/0301289 A1* | 10/2017 | Jeong | G09G 3/3233 | |
| 2018/0174525 A1* | 6/2018 | Kim | G09G 3/3266 | |
| 2019/0114966 A1* | 4/2019 | Park | G09G 3/3258 | |
| 2019/0197961 A1* | 6/2019 | Kim | G09G 3/3266 | |

* cited by examiner

DISPLAY DEVICE

CROSS-REFERENCE TO RELATED APPLICATION

This application claims priority to and the benefit of Korean Patent Application No. 10-2021-0058146, filed May 4, 2021, which is hereby incorporated by reference for all purposes as if fully set forth herein.

BACKGROUND

Field

One or more embodiments generally relate to a display device.

Discussion

A display device typically includes a display panel (or pixel unit) including a plurality of pixels and a driver for driving the display panel. The driver displays an image on the display panel using an image signal applied from, for instance, a graphic processor, such as an external graphic processor. The graphic processor generates an image signal by rendering original data, and the rendering time for which an image signal corresponding to one frame is generated may vary according to the kind or characteristic of an image. The driver may vary a driving frequency (or frame frequency), corresponding to the rendering time.

A pixel may include a light emitting element and a pixel circuit. When a scan signal is supplied from a scan line, the pixel circuit may be supplied with a data signal (or data voltage) from a data line, and supply a current of a driving transistor according to the data signal to the light emitting element. The light emitting element may emit light with a luminance corresponding to the current of the driving transistor.

While the pixel emits light, the luminance of the light emitting element may be changed due to a leakage current of the driving transistor and/or a hysteresis characteristic and a variation in voltage applied to the light emitting element corresponding to the hysteresis characteristic. For example, when the display device is driven at a low driving frequency, a variation in luminance of the light emitting element increases as one frame (or time for which the pixel emits light at a time) is lengthened. Therefore, this may be viewed by a user and reduce display quality. To minimize this, during one frame, the display device may supply an on-bias voltage (or initialization voltage) plural times (e.g., twice) to the driving transistor, and supply the initialization voltage the plural times to the light emitting element.

A parasitic capacitor may exist between the light emitting element (or one electrode of the light emitting element) and another component (e.g., a signal line or a specific node), and a signal (or a change in signal) of the other component may have influence on the voltage applied to the light emitting element through the parasitic capacitor. The influence on the light emitting element may be changed according to a time (or timing) at which the signal of the other component is changed and a time at which the initialization voltage is supplied to the light emitting element, and a luminance deviation may occur due to the influence that is differently exhibited for each pixel.

The above information disclosed in this section is only for understanding the background of the inventive concepts, and, therefore, may contain information that does not form prior art.

SUMMARY

One or more embodiments provide a display device capable of compensating for a luminance deviation caused by a variation in signal of another component in a pixel circuit.

Additional aspects will be set forth in the detailed description which follows, and, in part, will be apparent from the disclosure, or may be learned by practice of the inventive concepts.

According to an embodiment, a display device includes a display panel, a scan driver, a data compensator, and a data driver. The display panel includes a first area and a second area distinguished from each other along a scan direction. Each of the first and second areas include pixels. The scan driver is configured to sequentially provide scan signals to the display panel along the scan direction. The data compensator is configured to: detect a pattern in which a difference between adjacent grayscale values in image data is greater than a reference value; and generate compensated image data by compensating for grayscale values corresponding to the second area in the image data based on the pattern corresponding to the first area. The data driver is configured to: generate data signals based on the compensated image data; and provide the data signals to the display panel.

According to an embodiment, a display device includes a display panel, a scan driver, a data compensator, and a data driver. The display panel includes pixels. The scan driver is configured to sequentially provide scan signals to the display panel. The data compensator is configured to: detect a pattern in which a difference between adjacent grayscale values is greater than a reference value from previous half frame data; and generate compensated frame data by compensating for current half frame data based on the pattern. The data driver is configured to: generate data signals based on the compensated frame data; and provide the data signals to the display panel. The previous half frame data and the current half frame data are included in frame data corresponding to one frame period.

The foregoing general description and the following detailed description are illustrative and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

DETAILED DESCRIPTION OF SOME EMBODIMENTS

Figure 1:
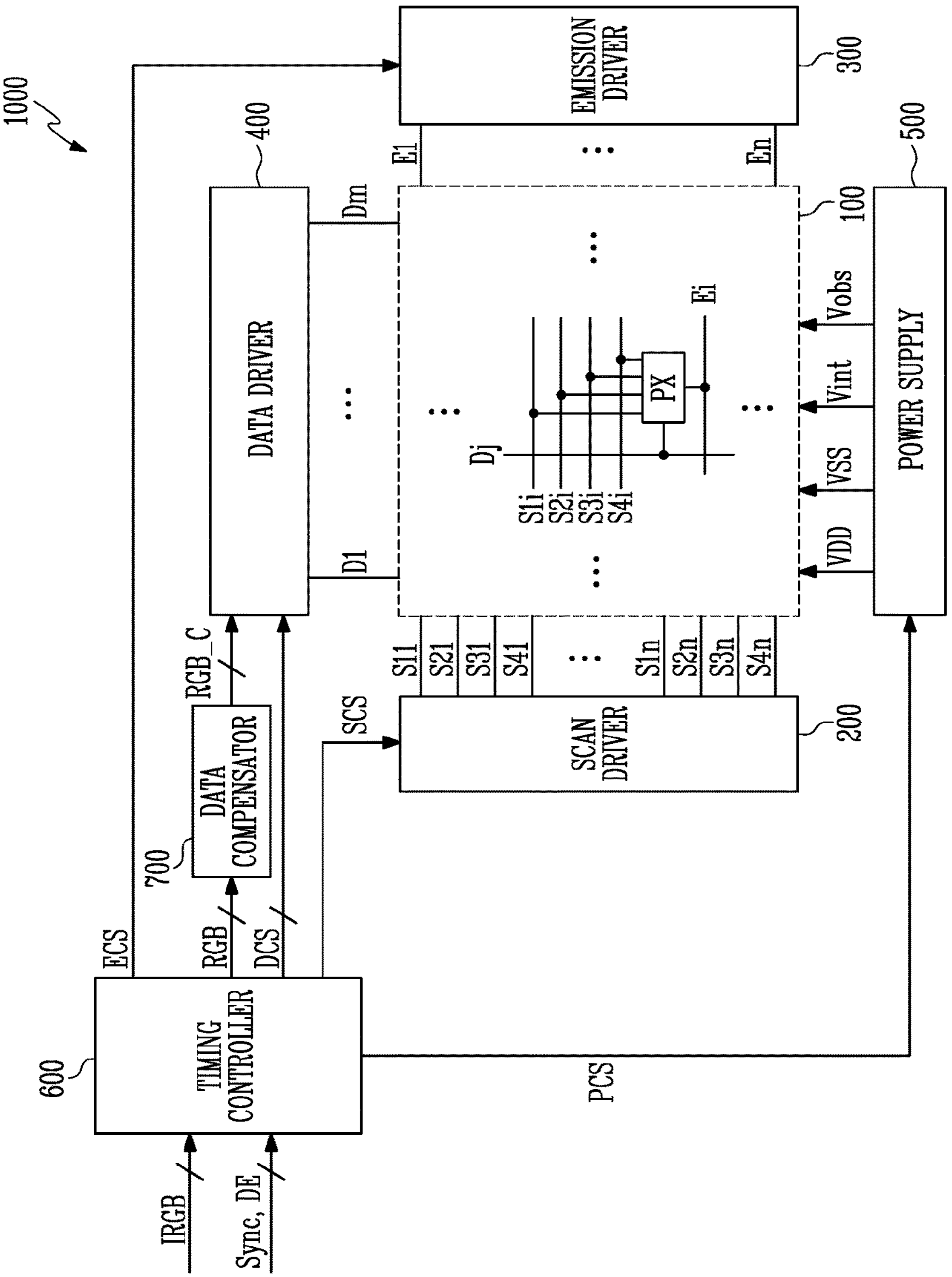
FIG. 1 is a bock diagram illustrating a display device according to an embodiment.

In the following description, for the purposes of explanation, numerous specific details are set forth to provide a thorough understanding of various embodiments. As used herein, the terms "embodiments" and "implementations" may be used interchangeably and are non-limiting examples employing one or more of the inventive concepts disclosed herein. It is apparent, however, that various embodiments may be practiced without these specific details or with one or more equivalent arrangements. In other instances, well-known structures and devices are shown in block diagram form to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing example features of varying detail of some embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing some embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, various embodiments will be explained in detail with reference to the accompanying drawings.

Figure 2:
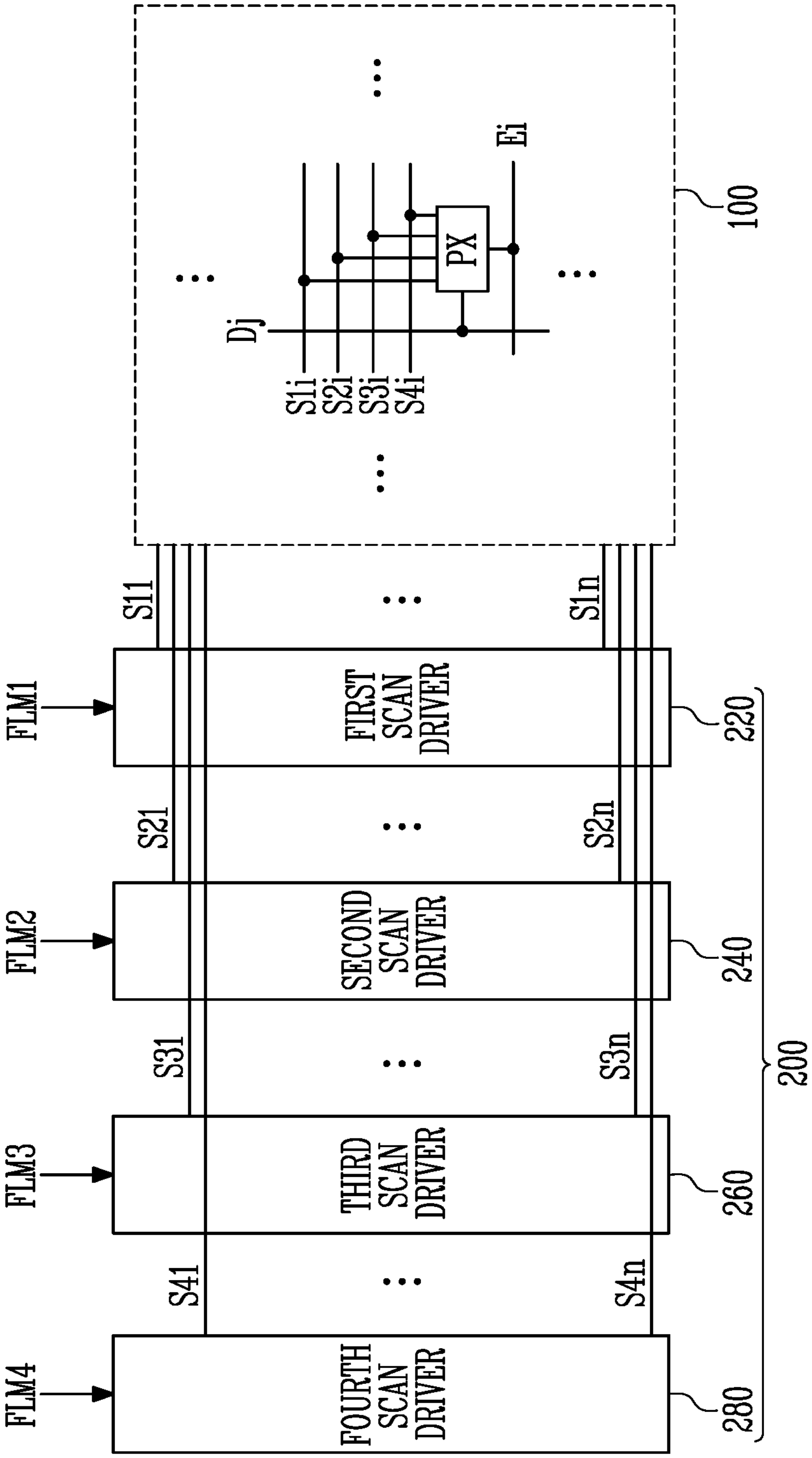
FIG. 2 is a diagram illustrating an example of a scan driver included in the display device shown in FIG. 1 according to an embodiment.

FIG. 1 is a bock diagram illustrating a display device according to an embodiment. FIG. 2 is a diagram illustrating an example of a scan driver included in the display device shown in FIG. 1 according to an embodiment.

Referring to FIGS. 1 and 2, the display device 1000 may include a display panel 100, a scan driver 200, an emission driver 300, a data driver 400, a power supply 500, a timing controller 600, and a data compensator 700.

The display device 1000 may display an image at various frame frequencies, refresh rates, driving frequencies, and/or screen refresh rates according to driving conditions. The frame frequency is a frequency at which a data voltage is substantially written to a driving transistor of a pixel PX for one second. For example, the frame frequency is also referred to as a screen scan rate or a screen refresh frequency, and represents a frequency at which a display screen is refreshed for one second.

In an embodiment, the display device 1000 may adjust an output frequency of the scan driver 200 and the emission driver 300 and an output frequency of the data driver 400, which corresponds thereto, according to driving conditions. For example, the display device 1000 may display an image, corresponding to various frame frequencies of 1 Hz to 120 Hz. However, this is merely illustrative, and the display device 1000 may also display an image at a frame frequency of 120 Hz or higher (e.g., 240 Hz or 480 Hz).

The display panel 100 may include scan lines S11 to S1*n*, S21 to S2*n*, S31 to S3*n*, and S41 to S4*n*, emission control lines E1 to En, and data lines D1 to Dm, as well as include pixels PX connected to the scan lines S11 to S1*n*, S21 to S2*n*, S31 to S3*n*, and S41 to S4*n*, the emission control lines E1 to En, and the data lines D1 to Dm (where m and n are integers greater than 1). For example, a pixel PX located on an i-th horizontal line (or i-th pixel row) and a j-th vertical line (or j-th pixel column) may be connected to a 1i-th scan line S1*i*, a 2i-th scan line S2*i*, a 3i-th scan line S3*i*, a 4i-th scan line S4*i*, and a j-th data line Dj (where i and j are natural numbers). Each of the pixels PX may be supplied with voltages of a first driving power source VDD, a second driving power source VSS, an on-bias power source Vobs, and an initialization power source Vint from the power supply 500.

In an embodiment, signal lines connected to the pixel PX may be variously set corresponding to a circuit structure of the pixel PX.

The scan driver 200 may receive a first control signal SCS from the timing controller 600, and supply a first scan signal, a second scan signal, a third scan signal, and a fourth scan signal respectively to first scan lines S11 to S1*n*, second scan lines S21 to S2*n*, third scan lines S31 to S3*n*, and fourth scan lines S41 to S4*n* based on the first control signal SCS.

The first to fourth scan signals may be set to a gate-on voltage corresponding to a type of transistor(s) to which the corresponding scan signals are supplied. The transistors may be turned on or set to a turn-on state in response to the gate-on voltage. For example, the gate-on voltage of a scan signal supplied to a P-channel metal oxide semiconductor (PMOS) transistor may have a logic low level, and the gate-on voltage of a scan signal supplied to an N-channel metal oxide semiconductor (NMOS) transistor may have a logic high level. Hereinafter, it will be understood that the phrase "that a scan signal is supplied" means that the scan signal is supplied with a logic level at which a transistor controlled by the scan signal is turned on.

For convenience of description, a case where the scan driver 200 is a single component has been illustrated in FIG. 1, but embodiments are not limited thereto. The scan driver 200 may include a plurality of scan drivers that respectively supply at least one of the first to fourth scan signals according to a design.

Referring to FIG. 2, the scan driver 200 may include a first scan driver 220, a second scan driver 240, a third scan driver 260, and a fourth scan driver 280.

The first control signal SCS may include first to fourth scan start signals FLM1 to FLM4 and clock signals. The first to fourth scan start signals FLM1 to FLM4 may be respectively supplied to the first to fourth scan drivers 220, 240, 260, and 280. A pulse width, a supply timing, and the like of each of the first to fourth scan start signals FLM1 to FLM4 may be determined according to a driving condition of the pixel PX and a frame frequency.

The first to fourth scan drivers 220 to 280 may respectively output first to fourth scan signals based on the first to fourth scan start signals FLM1 to FLM4. The first scan driver 220 may sequentially supply the first scan signal to the first scan lines S11 to Sin in response to the first scan start signal FLM1. The second scan driver 240 may sequentially supply the second scan signal to the second scan lines S21 to S2*n* in response to the second scan start signal FLM2. The third scan driver 260 may sequentially supply the third scan signal to the third scan lines S31 to S3*n* in response to the third scan start signal FLM3. The fourth scan driver 280 may sequentially supply the fourth scan signal to the fourth scan lines S41 to S4*n* in response to the fourth scan start signal FLM4.

Each of the first to fourth scan drivers 220, 240, 260, and 280 may be implemented as a shift register that sequentially generates and outputs a scan signal in a pulse form by sequentially shifting a scan start signal in a pulse form (e.g., a corresponding scan start signal among the first to fourth scan start signals FLM1 to FLM4) using the clock signals.

Referring back to FIG. 1, the emission driver 300 may supply an emission control signal to the emission control lines E1 to En based on a second control signal ECS. For example, the emission control signal may be sequentially supplied to the emission control lines E1 to En.

The emission control signal may be set to a gate-off voltage (e.g., a logic high level). A transistor receiving the emission control signal may be turned off when the emission control signal is supplied, and may be set to the turn-on state in other cases. Hereinafter, it will be understood that the term "that the emission control signal is supplied" means that the emission control signal is supplied with a logic level at which a transistor controlled by the emission control signal is turned off.

The second control signal ECS may include an emission start signal and clock signals, and the emission driver 300 may be implemented as a shift register that sequentially generates and outputs the emission control signal in a pulse form by sequentially shifting the emission start signal in a pulse form using the clock signals.

The data driver 400 may receive a third control signal DCS from the timing controller 600, and receive compensated image data RGB_C (or compensated frame data) from the data compensator 700. The data driver 400 may convert the compensated image data RGB_C in a digital form into an analog data signal (e.g., a data signal). The data driver 400 may supply a data signal to the data lines D1 to Dm corresponding to the third control signal DCS. The data signal supplied to the data lines D1 to Dm may be supplied to be synchronized with the fourth scan signal supplied to the fourth scan lines S41 to S4*n*.

The third control signal DCS may include a load signal (or data enable signal) instructing output of a valid data signal, a horizontal start signal, a data clock signal, and/or the like. For example, the data driver 400 may include a shift register that generates a sampling signal by shifting the horizontal start signal in synchronization with the data clock signal, a latch that latches the compensated image data RGB_C in response to the sampling signal, a digital-analog converter (or decoder) that converts the latched image data (e.g., data in a digital form) into data signals in an analog form, and buffers (or amplifiers) that output the data signals to the data lines DL1 to DLm.

The power supply 500 may supply, to the display panel 100, a voltage of the first driving power source VDD for driving the pixel PX and a voltage of the second driving power source VSS. A voltage level of the second driving power source VSS may be lower than that of the first driving power source VDD. For example, the voltage of the first driving power source VDD may be a positive voltage, and the voltage of the second driving power source VSS may be a negative voltage.

Figure 3:
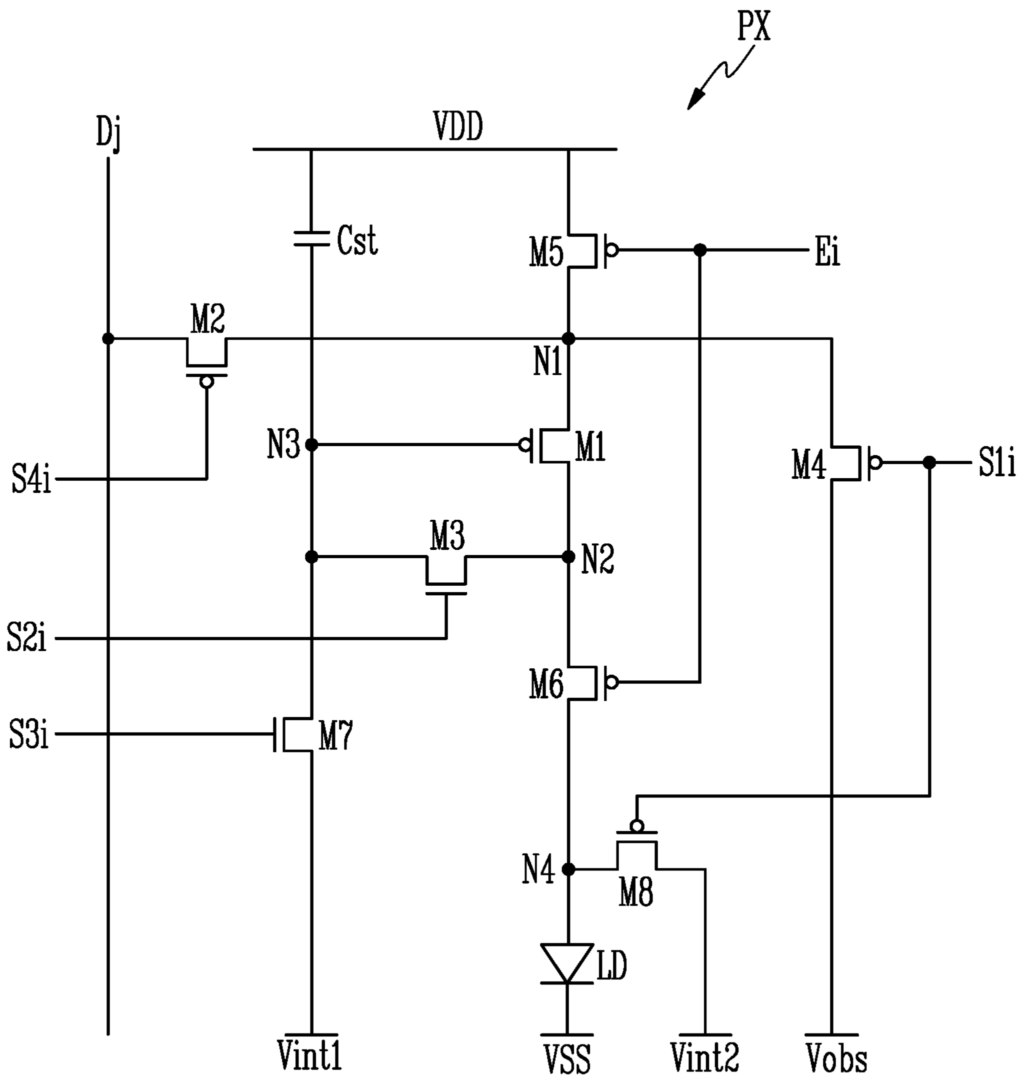
FIG. 3 is a circuit diagram illustrating an example of a pixel included in the display device shown in FIG. 1 according to an embodiment.

The power supply 500 may supply a voltage of the on-bias power source Vobs and a voltage of the initialization power source Vint to the display panel 100. The initialization power source Vint may include initialization power sources (e.g., Vint1 and Vint2, which are shown in FIG. 3) output with different voltage levels. The power supply 500 may be implemented as a power management integrated circuit (PMIC).

The on-bias power source Vobs may be a power source for supplying a predetermined bias voltage to a source electrode and/or a drain electrode of the driving transistor included in the pixel PX. The voltage of the on-bias power source Vobs may be a positive voltage. However, the voltage level of the on-bias power source Vobs is not limited thereto, and may be a negative voltage.

The initialization power source Vint may be a power source for initializing the pixel PX. For example, the driving transistor and/or a light emitting element, included in the pixel PX, may be initialized by the voltage of the initialization power source Vint. The voltage of the initialization power source Vint may be a negative voltage.

The timing controller 600 may be supplied with input image data IRGB and control signals Sync and DE from a host system, such as an Application Processor (AP), through a predetermined interface.

The timing controller 600 may generate the first control signal SCS, the second control signal ECS, the third control signal DCS, and a fourth control signal PCS based on the input image data IRGB, a synchronization signal Sync (e.g., a vertical synchronization signal, a horizontal synchronization signal, etc.), a data enable signal DE, a clock signal, and/or the like. The first control signal SCS may be supplied to the scan driver 200, the second control signal ECS may be supplied to the emission driver 300, the third control signal DCS may be supplied to the data driver 400, and the fourth control signal PCS may be supplied to the power supply 500. The timing controller 600 may generate image data RGB (or frame data) by rearranging the input image data IRGB corresponding to the arrangement of the pixels PX in the display panel 100.

The data compensator 700 may sense (or detect) a pattern in which a grayscale change considerably occurs in the image data RGB, and compensate for grayscale values with respect to an area in which an unwanted luminance change is to occur due to the pattern. For example, the data compensator 700 may sense a pattern in which a difference between adjacent grayscale values in the image data RGB is greater than a predetermined reference value, predict an area in which a luminance change occurs due to the pattern (e.g., a second area different from a first area in which an image corresponding to the pattern is displayed in the display panel 100) based on the output frequency of the first scan signal applied to the first scan lines S11 to S1*n*, and compensate for grayscale values corresponding to the area. For instance, the data compensator 700 may generate the compensated image data RGB_C by detecting a pattern and compensating for the image data RGB based on the pattern.

At least a portion of the data compensator 700 may be implemented as an integrated circuit (e.g., an integrated circuit or field-programmable gate array (FPGA), which includes a transistor, a capacitor, a register, a multiplexer, and the like), or may be implemented in a software manner in the integrated circuit.

A luminance change occurring due to the pattern will be described later with reference to FIGS. 6 to 9, and a detailed configuration and operation of the data compensator 700 for compensating for the luminance change will be described later with reference to FIGS. 10 and 11.

At least one of the scan driver 200, the emission driver 300, the data driver 400, the power supply 500, the timing controller 600, and the data compensator 700 may be formed in the display panel 100, or may be implemented as an integrated circuit to be connected in, for example, a tape carrier package form to the display panel 100. At least two of the scan driver 200, the emission driver 300, the data driver 400, the power supply 500, the timing controller 600, and the data compensator 700 may be implemented as one integrated circuit. For example, at least a portion of the data compensator 700 may be included in the timing controller 600. For example, the data driver 400 and the timing controller 600 may be implemented as one integrated circuit.

FIG. 3 is a circuit diagram illustrating an example of the pixel included in the display device shown in FIG. 1 according to an embodiment. The pixels PX included in the display device 1000 are substantially identical to one another. Therefore, for convenience of description, a pixel PX located on an i-th horizontal line (or i-th pixel row) and is connected to a j-th data line Dj (or j-th pixel column) is illustrated in FIG. 3.

Referring to FIGS. 1 and 3, the pixel PX may include a light emitting element LD, first to eighth transistors M1 to M8, and a storage capacitor Cst.

The light emitting element LD may be connected between the first driving power source VDD (or a first power line to which the voltage of the first driving power source VDD is applied) and the second driving power source VSS (or a second power line to which the voltage of the second driving power source VDD is applied). A first electrode of the light emitting element LD may be connected to the sixth transistor M6 (or a fourth node N4), and a second electrode of the light emitting element LD may be connected to the second driving power source VSS. For example, the first electrode of the light emitting element LD may be an anode electrode, and the second electrode of the light emitting element LD may be a cathode electrode. The light emitting element LD may emit light with a predetermined luminance corresponding to an amount of current (e.g., driving current) supplied from the first transistor M1.

In an embodiment, the light emitting element LD may be an organic light emitting diode including an organic emitting layer. In another embodiment, the light emitting element LD may be an inorganic light emitting element formed of an inorganic material. In still another embodiment, the light emitting element LD may be a light emitting element made of a combination of an organic material and an inorganic material. The light emitting element LD may have a form in which a plurality of inorganic light emitting elements are connected in parallel and/or series between the second driving power source VSS and the sixth transistor M6.

A first electrode of the first transistor M1 (or driving transistor) may be connected to a first node N1, and a second electrode of the first transistor M1 may be connected to a second node N2. A gate electrode of the first transistor M1 may be connected to a third node N3. The first transistor M1 may control an amount of current flowing from the first driving power source VDD to the second driving power source VSS via the light emitting element LD corresponding to a voltage of the third node N3. To this end, the first driving power source VDD may be set to a voltage higher than that of the second driving power source VSS.

The second transistor M2 may be connected between the j-th data line Dj and the first node N1. A gate electrode of the second transistor M2 may be connected to a 4i-th scan line S4*i*. The second transistor M2 may be turned on in response to the fourth scan signal being supplied to the 4i-th scan line S4*i* to electrically connect the j-th data line Dj and the first node N1 to each other.

The third transistor M3 may be connected between the second electrode of the first transistor M1 (or the second node N2) and the gate electrode of the first transistor M1 (or the third node N3). A gate electrode of the third transistor M3 may be connected to a 2i-th scan line S2*i*. The third transistor M3 may be turned on in response to the second scan signal being supplied to the 2i-th scan line S2*i* to electrically connect the second electrode and the gate electrode of the first transistor M1 (or the second node N2 and the third node N3) to each other. For example, a timing at which the second electrode (e.g., a drain electrode) of the first transistor M1 and the gate electrode of the first transistor M1 are connected to each other may be controlled by the second scan signal. When the third transistor M3 is turned on, the first transistor M1 may be connected in a diode form.

The fourth transistor M4 may be connected between the first node N1 (or the first electrode of the first transistor M1) and the on-bias power source Vobs. A gate electrode of the fourth transistor M4 may be connected to a 1i-th scan line S1*i*. The fourth transistor M4 may be turned on in response to the first scan signal being supplied to the lit-h scan line S1*i* to supply the voltage of the on-bias power source Vobs to the first transistor M1. A timing at which the voltage of the on-bias power source Vobs is supplied to the first node N1 may be controlled by the first scan signal. The voltage of the on-bias power source Vobs may have a level similar to that of a data signal of a black grayscale. For example, the voltage of the on-bias power source Vobs may have a level of about 5 V to about 7 V.

In response to the fourth transistor being turned on, a predetermined high voltage may be applied to the first electrode (e.g., a drain electrode) of the first transistor M1. When the third transistor M3 is in a turn-off state, the first transistor M1 may have an on-bias state (e.g., a state in which the first transistor M1 can be turned on).

The fifth transistor M5 may be connected between the first driving power source VDD and the first node N1. A gate electrode of the fifth transistor M5 may be connected to an i-th emission control line Ei. The fifth transistor M5 may be turned off in response to the emission control signal being supplied to the i-th emission control line Ei, and may be turned on in other cases.

The sixth transistor M6 may be connected between the second electrode of the first transistor M1 (or the second node N2) and the first electrode of the light emitting element LD (or the fourth node N4). A gate electrode of the sixth transistor M6 may be connected to the i-th emission control line Ei. The sixth transistor M6 may operate substantially identically to the fifth transistor M5.

In FIG. 3, it is illustrated that the fifth transistor M5 and the sixth transistor M6 are connected to the same i-th emission control line Ei. However, this is merely illustrative, and the fifth transistor M5 and the sixth transistor M6 may be respectively connected to emission control lines to which different emission control signals are supplied.

The seventh transistor M7 may be connected to the third node N3 and a first initialization power source Vint1. A gate electrode of the seventh transistor M7 may be connected to a 3i-th scan line S3*i*. The seventh transistor M7 may be turned on in response to the third scan signal being supplied to the 3i-th scan line S3*i* to supply a voltage of the first initialization power source Vint1 to the third node N3. The voltage of the first initialization power source Vint1 may be set to a voltage lower than that of a data signal supplied to the j-th data line Dj. A gate voltage of the first transistor M1 may be initialized to the voltage of the first initialization power source Vint1 by the turn-on of the seventh transistor M7.

The eighth transistor M8 (or switching transistor) may be connected between the first electrode of the light emitting element LD (i.e., the fourth node N4) and a second initialization power source Vint2. In an embodiment, a gate electrode of the eighth transistor M8 may be connected to the 1i-th scan line S1*i*. The eighth transistor M8 may be turned on in response to the first scan signal being supplied to the 1i-th scan line S1*i* to supply a voltage of the second initialization power source Vint2 to the first electrode of the light emitting element LD.

In response to the voltage of the second initialization power source Vint2 being supplied to the first electrode of the light emitting element LD, a parasitic capacitor of the light emitting element LD may be discharged. Since a residual voltage charged in the parasitic capacitor is discharged (e.g., eliminated), unintended fine emission can be prevented. Thus, a black expression capability of the pixel PX can be improved.

The voltage of the second initialization power source Vint2 may be set such that the voltage of the second initialization power source Vint2 is lower than a value obtained by adding up a threshold voltage of the light emitting element LD and the voltage of the second driving power source VSS. However, this is merely illustrative, and the voltage of the first initialization power source Vint1 and the voltage of the second initialization power source Vint2 may be variously set. In an example, the voltage of the first initialization power source Vint1 and the voltage of the second initialization power source Vint2 may be substantially equal.

The storage capacitor Cst may be formed or connected between the first driving power source VDD and the third node N3. The storage capacitor Cst may store a voltage applied to the third node N3.

The first transistor M1, the second transistor M2, the fourth transistor M4, the fifth transistor M5, the sixth transistor M6, and the eighth transistor M8 may be implemented with a polysilicon semiconductor transistor. For example, the first transistor M1, the second transistor M2, the fourth transistor M4, the fifth transistor M5, the sixth transistor M6, and the eighth transistor M8 may include, as an active layer (or channel), a polysilicon semiconductor layer formed through a low temperature polysilicon (LTPS) process. Also, the first transistor M1, the second transistor M2, the fourth transistor M4, the fifth transistor M5, the sixth transistor M6, and the eighth transistor M8 may be implemented with a P-type transistor (e.g., a PMOS transistor). Accordingly, a gate-on voltage at which the first transistor M1, the second transistor M2, the fourth transistor M4, the fifth transistor M5, the sixth transistor M6, and the eighth transistor M8 are turned on may have a logic low level. Since the polysilicon semiconductor transistor has a fast response speed, the polysilicon semiconductor transistor may be applied to a switching element using fast switching.

The third transistor M3 and the seventh transistor M7 may be implemented with an oxide semiconductor transistor. For example, the third transistor M3 and the seventh transistor M7 may be implemented with an N-type oxide semiconductor transistor (e.g., an NMOS transistor), and include an oxide semiconductor layer as an active layer. Accordingly, a gate-on voltage at which the third transistor M3 and the seventh transistor M7 are turned on may have a logic high level. The oxide semiconductor transistor can be formed through a low temperature process, and have a charge mobility lower than that of a polysilicon semiconductor transistor. For instance, the oxide semiconductor transistor may have an excellent off-current characteristic. Thus, when the third transistor M3 and the seventh transistor M7 are implemented with the oxide semiconductor transistor, leakage current from the second node N2 according to the low frequency driving can be minimized (or at least reduced), and accordingly, display quality can be improved.

However, the first to eighth transistors M1 to M8 are not limited thereto. At least one of the first transistor M1, the second transistor M2, the fourth transistor M4, the fifth transistor M5, the sixth transistor M6, and the eighth transistor M8 may be implemented with the oxide semiconductor transistor, and/or at least one of the third transistor M3 and the seventh transistor M7 may be implemented with the polysilicon semiconductor transistor.

Figure 4:
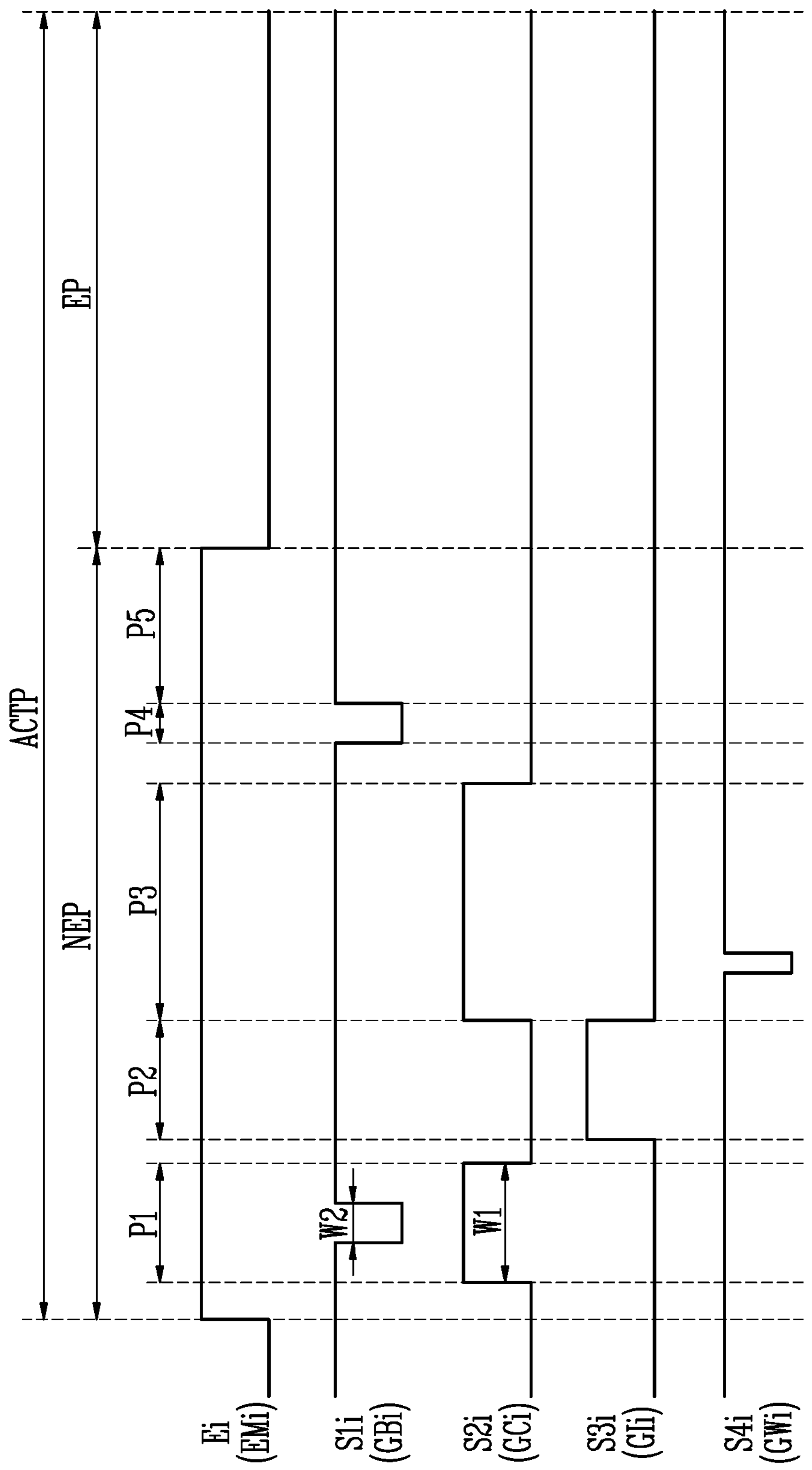
FIG. 4 is a timing diagram illustrating an example of signals supplied to the pixel shown in FIG. 3 according to an embodiment.
Figure 5A:
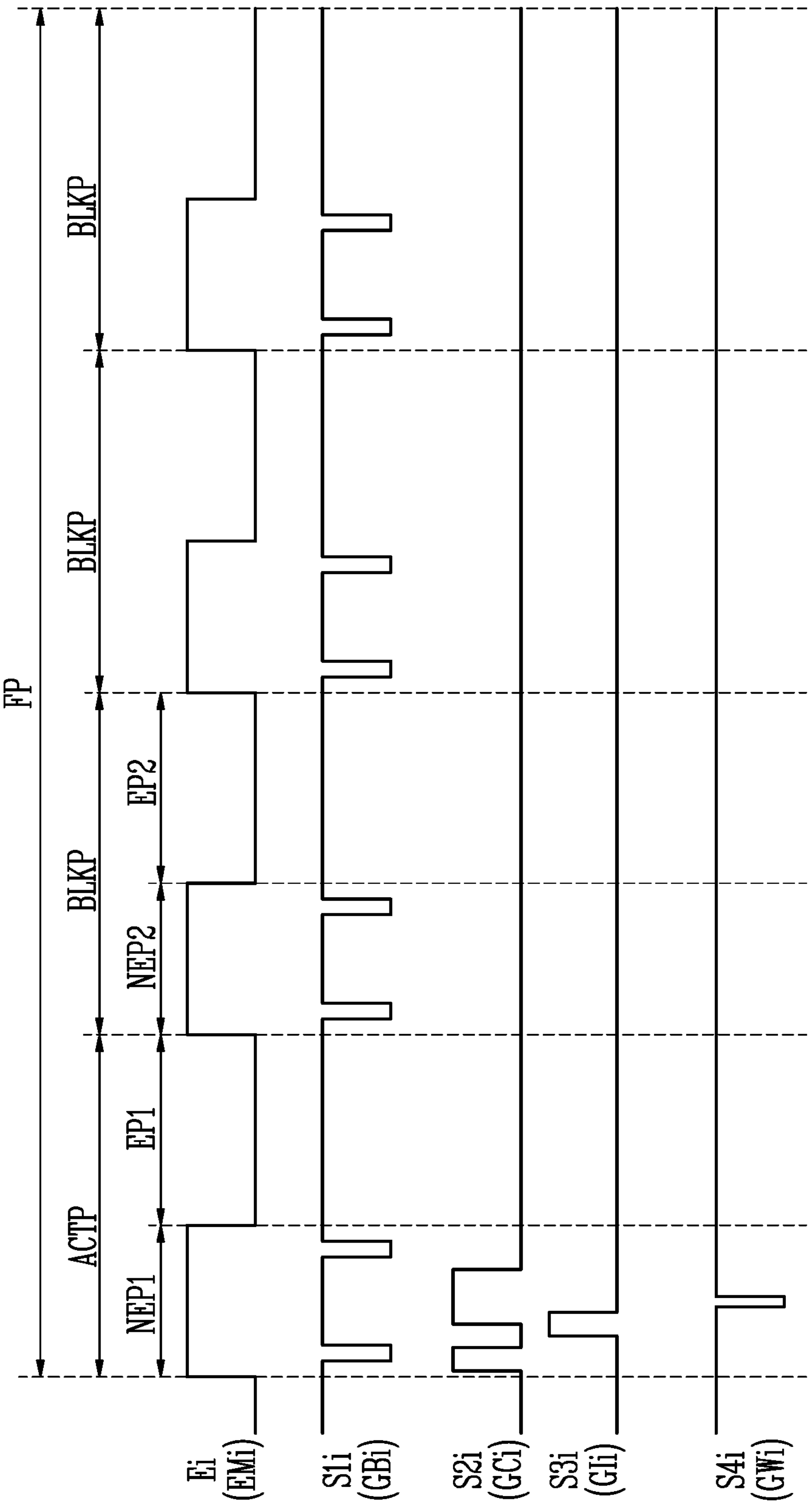
FIG. 5A is a timing diagram illustrating an example of the signals supplied to the pixel shown in FIG. 3 during one frame period according to an embodiment.
Figure 5B:
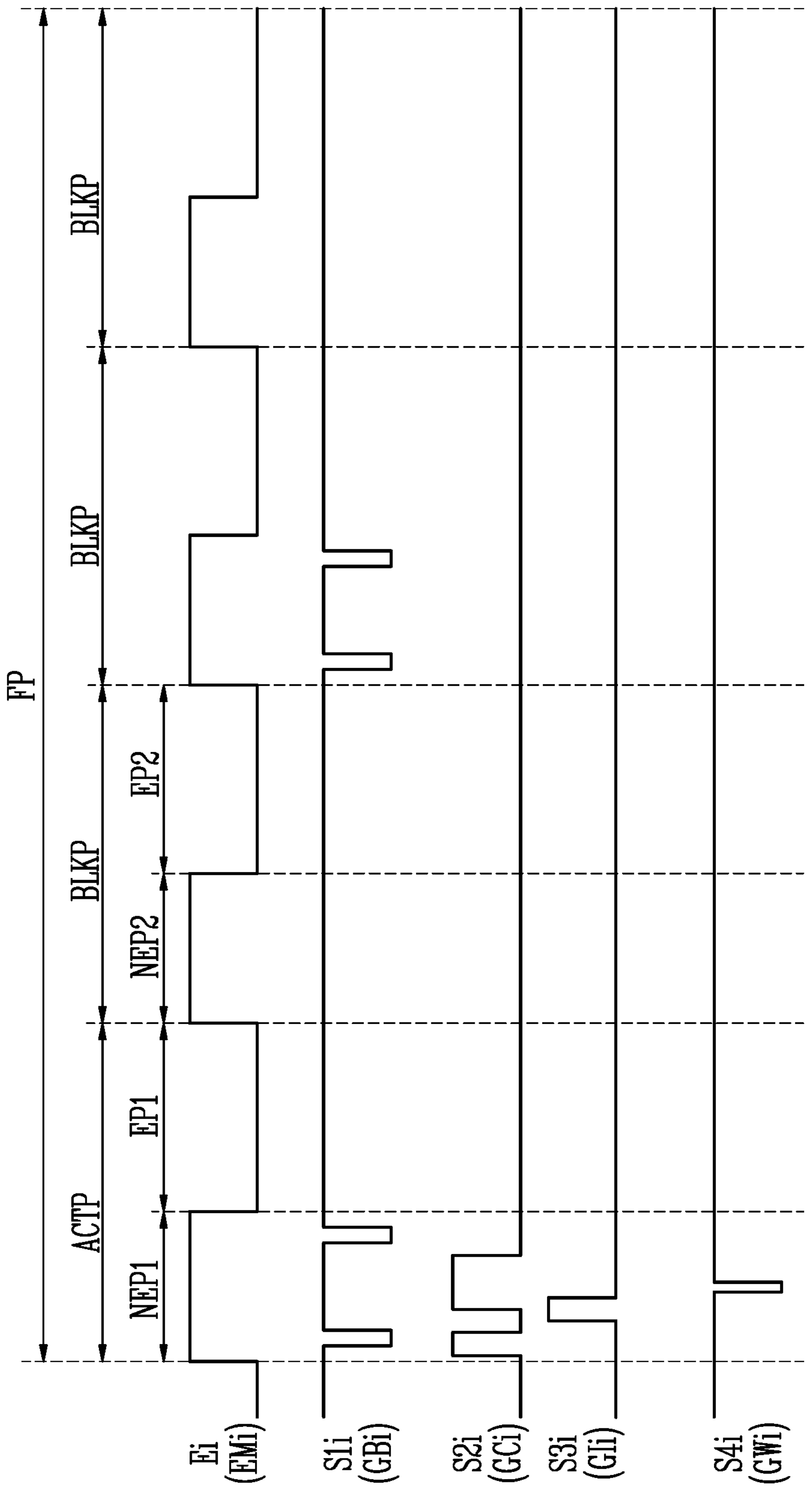
FIG. 5B is a timing diagram illustrating another example of the signals supplied to the pixel shown in FIG. 3 during the one frame period according to an embodiment.

FIG. 4 is a timing diagram illustrating an example of signals supplied to the pixel shown in FIG. 3 according to an embodiment. FIG. 5A is a timing diagram illustrating an example of the signals supplied to the pixel shown in FIG. 3 during one frame period according to an embodiment. FIG. 5B is a timing diagram illustrating another example of the signals supplied to the pixel shown in FIG. 3 during the one frame period according to an embodiment.

Referring to FIGS. 3, 4, 5A, and 5B, in variable frequency driving in which a frame frequency is controlled, one frame period FP (or frame) may include an active period ACTP and a blank period BLKP.

The active period ACTP may include a first non-emission period NEP1 and a first emission period EP1. The blank period BLKP may include a second non-emission period NEP2 and a second emission period EP2. A non-emission period NEP and an emission period EP, which are shown in FIG. 4, may be respectively the first non-emission period NEP1 and the first emission period EP1, which are shown in FIGS. 5A and 5B. A period in which an emission control signal EMi has a logic low level may be an emission period EP, EP1, or EP2, and a period except the emission period EP, EP1, or EP2 may be a non-emission period NEP, NEP1, or NEP2.

The active period ACTP may include a period in which a data signal corresponding to an output image is written to the pixel PX. For example, when a still image is displayed in low frequency driving, a data signal may be written to the pixel PXL for each active period ACTP.

As shown in FIGS. 5A and 5B, the emission control signal EMi may be supplied to the emission control line E1 at a first frequency higher than the frame frequency. A third scan signal GIi and a fourth scan signal GWi may be respectively supplied to the 3i-th scan line S3*i* and the 4i-th scan line S4*i* at a second frequency lower than the first frequency. For example, the first frequency may be 240 Hz, and the second frequency may be 60 Hz. Frequencies of the third scan signal GIi and the fourth scan signal GWi may be substantially equal to the frame frequency.

However, this is merely illustrative, and the second frequency may be 60 Hz or lower. A number of times that the blank period BLKP is repeated in the frame period FP (e.g., a number of blank periods BLKP) may increase as the second frequency becomes lower or as a difference between the first frequency and the second frequency becomes larger. For example, the frame period FP may include one active period ACTP and a plurality of consecutive blank periods BLKP.

In an embodiment, a second scan signal GCi may be supplied in only the first non-emission period NEP1. The second scan signal GCi may be supplied plural times to the 2i-th scan line S2*i* in the first non-emission period NEP1. However, embodiments are not limited thereto, and the second scan signal GCi may be supplied only once in the first non-emission period NEPL.

In an embodiment, a first scan signal GBi may be supplied in the first non-emission period NEP1 and the second non-emission period NEP2. For example, as shown in FIG. 5A, the first scan signal GBi may be supplied for every blank period BLKP. Alternatively, the first scan signal GBi may be supplied with a specific cycle (or frequency) in only some of the blank periods BLKP. For example, the first scan signal GBi may be supplied to the 1i-th scan line S1*i* in only the active period ACTP and a second blank period BLKP shown in FIG. 5B.

The first scan signal GBi may be supplied plural times to the 1i-th scan line S1*i* in the first non-emission period NEP1. Also, the first scan signal GBi may be supplied plural times to the 1i-th scan line S1*i* in the second non-emission period NEP2. However, the present disclosure is not limited thereto, and the first scan signal GBi may be supplied only once in each of the first non-emission period NEP1 and the second non-emission period NEP2.

The first scan signal GBi may be a signal for controlling the first transistor M1 to be in the on-bias state. For example, in response to the fourth transistor M4 being turned on by the first scan signal GBi, the voltage of the on-bias power source Vobs may be supplied to the first node N1. Also, the first scan signal GBi may be a signal for initializing the light emitting element LD. For example, in response to the eighth transistor M8 being turned on by the first scan signal GBi, the voltage of the second initialization power source Vint2 may be supplied to the fourth node N4.

In the display device 1000 (see FIG. 1) in accordance with various embodiments, the voltage of the on-bias power source Vobs may be periodically applied to the first electrode of the first transistor M1 using the fourth transistor M4. In response to the voltage of the on-bias voltage Vobs being supplied to the first electrode of the first transistor M1, the first transistor M1 may be in the on-bias state, and a threshold voltage characteristic of the first transistor M1 may be changed or be compensated. Thus, the first transistor M1 can be prevented from being degraded since a characteristic of the first transistor M1 is fixed to a specific state in the low frequency driving.

In the display device 1000 (see FIG. 1) in accordance with various embodiments, the voltage of the second initialization power source Vint2 may be periodically applied to the first electrode (or the anode electrode) of the light emitting element LD using the eighth transistor M8. In response to the voltage of the second initialization power source Vint2 being supplied to the first electrode of the light emitting element LD, a residual voltage charged in the parasitic capacitor of the light emitting element LD is discharged (e.g., eliminated) so that unintended fine emission can be prevented.

A gate-on voltage of the second scan signal GCi and the third scan signal GIi, which are respectively supplied to the third transistor M3 and the seventh transistor M7 as the N-type transistors, may have a logic high level. A gate-on voltage of the fourth scan signal GWi and the first scan signal GBi, which are respectively supplied to each of the second transistor M2 and the fourth and eighth transistors M4 and M8 as the P-type transistors, may have a logic low level.

Hereinafter, the first to fourth scan signal GBi, GCi, GIi, and GWi supplied in the active period ACTP and an operation of the pixel PX1 will be described in more detail with reference to FIGS. 3 and 4.

An i-th emission control signal EMi may be supplied to the i-th emission control line E1 during the non-emission period NEP. Accordingly, the fifth transistor M5 and the sixth transistor M6 may be turned off during the non-emission period NEP. The non-emission period NEP may include first to fifth periods P1 to P5.

In the first period P1, the scan driver 200 may supply the second scan signal GCi to the 2i-th scan line S2*i*, and supply the first scan signal GBi to the 1i-th scan line S1*i*. In an embodiment, the first scan signal GBi may be supplied after the second scan signal GCi is supplied. Therefore, in the first period P1, the fourth transistor M4 may be turned on after the third transistor M3 is turned on.

When only the fourth transistor M4 is turned on without supplying the second scan signal GCi, the voltage of the on-bias power source Vobs may be supplied to the first node N1, and the first transistor M1 may have the on-bias state. For example, when the voltage of the on-bias voltage Vobs is about 5 V or higher, the first transistor M1 has a source voltage and a drain voltage of about 5 V or higher, and the absolute value of a gate-source voltage of the first transistor M1 may increase.

In response to a data signal being supplied by the supply of the fourth scan signal GWi in this state, a driving current may be unintentionally changed due to influence of the bias state of the first transistor M1, and luminance of the pixel PX may fluctuate (e.g., an increase in luminance).

To solve this problem, the scan driver 200 may supply the second scan signal GCi earlier than the first scan signal GBi in the first period P1. Therefore, the third transistor M3 may be turned on earlier than the fourth transistor M4. The second node N2 and the third node N3 may be electrically connected to each other in response to the third transistor M3 being turned on. Subsequently, in response to the fourth transistor M4 being turned on, the voltage of the on-bias voltage Vobs may be transferred up to the third node N3 through the first node N1. For example, a voltage difference between the first node N1 and the third node N3 may decrease to the level of the threshold voltage of the first transistor M1. Therefore, the magnitude of the gate-source voltage of the first transistor M1 may be considerably decreased in the first period P1. For example, the first transistor M1 may be set to an off-bias state.

As described above, to prevent an unintended luminance increase in luminance due to the supply of the voltage of the on-bias power source Vobs before the data signal is written in the first period P1, the supply of the first scan signal GBi and the second scan signal GCi may be controlled such that the fourth transistor M4 is turned on in a state in which the third transistor M3 is turned on.

In an embodiment, a width W1 of the second scan signal GCi may be greater than a width W2 of the first scan signal GBi in the first period P1. For example, in the first period P1, the third transistor M3 may be turned on earlier than the fourth transistor M4, and may be turned off after the fourth transistor M4 is turned off. However, this is merely illustrative, the third transistor M3 may be turned off earlier than the fourth transistor M4.

In some embodiments, the eighth transistor M8 may be turned on in response to the first scan signal GBi, and the voltage of the second initialization power source Vint2 may be supplied to the first electrode of the light emitting element LD (e.g., the fourth node N4).

Subsequently, in the second period P2, the scan driver 200 may supply the third scan signal GIi to the 3i-th scan line S3*i*. The seventh transistor M7 may be turned on by the third scan signal GIi. In response to the seventh transistor M7 being turned on, the voltage of the first initialization power source Vint1 may be supplied to the gate electrode of the first transistor M1. For example, in the second period P2, the gate voltage of the first transistor M1 may be initialized based on the voltage of the first initialization power source Vint1. Therefore, a strong on-bias may be applied to the first transistor M1, and a hysteresis characteristic may be changed (e.g., threshold voltage may be shifted).

Subsequently, in the third period P3, the scan driver 200 may supply the second scan signal GCi to the 2i-th scan line S2*i*. The third transistor M3 may be again turned on in response to the second scan signal GCi. In the third period P3, the scan driver 200 may supply the fourth scan signal GWi to the 4i-th scan line S4*i* while overlapping with a portion of the second scan signal GCi. The second transistor M2 may be turned on by the fourth scan signal GWi, and the data signal may be provided to the first node N1.

The first transistor M1 may be connected in the diode form by the turned-on third transistor M3, and data signal writing and threshold voltage compensation may be performed. Since the supply of the second scan signal GCi is maintained even after the supply of the fourth scan signal GWi is suspended, the threshold voltage of the first transistor M1 may be compensated for a sufficient time.

Subsequently, in the fourth period P4, the scan driver 200 may again supply the first scan signal GBi to the 1i-th scan line S1*i*. Therefore, the fourth transistor M4 and the eighth transistor M8 may be turned on. The voltage of the on-bias power source Vobs may be supplied to the first node N1 in response to the fourth transistor M4 being turned on.

Influence of the strong on-bias applied in the second period P2 may be eliminated by the data signal writing and the threshold voltage compensation. For example, a voltage difference between the gate voltage and the source voltage (and the drain voltage) of the first transistor M1 may be considerably decreased by the threshold voltage compensation in the third period P3. Then, the characteristic of the first transistor M1 may be again changed, and a driving current of the emission period EP may increase or excitation of the black grayscale may be viewed.

To prevent this characteristic change, the fourth transistor M4 may be turned on in the fourth period P4. Therefore, in the fourth period P4, the voltage of the on-bias power source Vobs may be supplied to the source electrode of the first transistor M1 so that the first transistor M1 can be set to the on-bias state.

A sufficient spare time may be implemented between the fourth period P4 and the emission period EP so as to allow the first transistor M1 to be set to a stable on-bias state before emission by an operation in the fourth period P4. Therefore, the fifth period P5 in which the first to fourth scan signals GBi, GCi, GIi, and GWi are not supplied may be inserted between the fourth period P4 and the emission period EP.

In an embodiment, the fifth period P5 may correspond to four horizontal cycles or more. For example, the fifth period P5 may have a length of about 10 μs or more. As such, the first transistor M1 can have a stable on-bias state before the emission period EP. Thus, emission luminance can be stably maintained even when the frame period FP shown in FIGS. 5A and 5B is repeated.

In an embodiment, the first to fourth scan signals GBi, GCi, GIi, and GWi may be respectively supplied from the first to fourth scan drivers 220, 240, 260, and 280 shown in FIG. 2.

Figure 6:
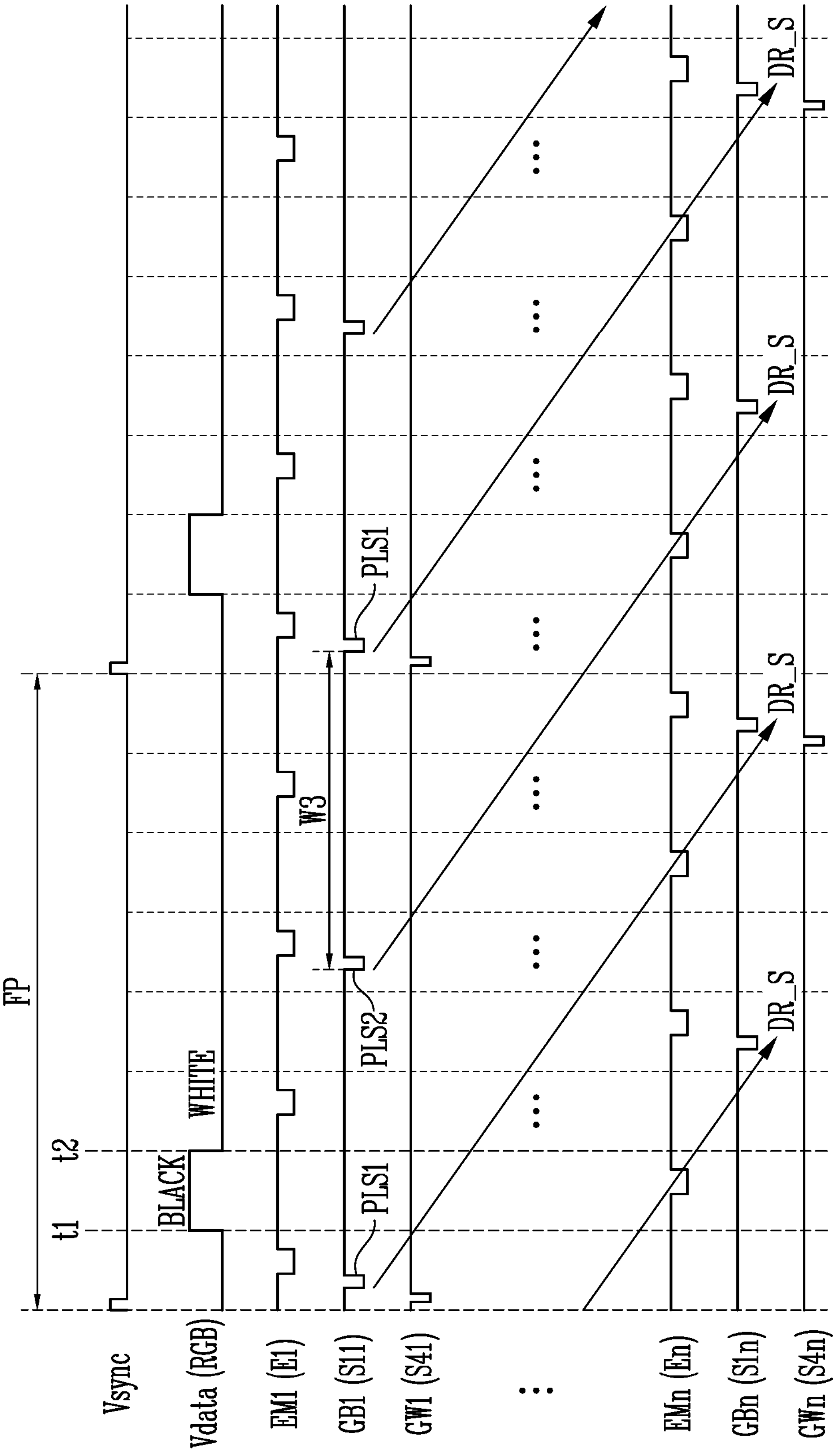
FIG. 6 is a timing diagram illustrating an example of signals supplied to a plurality of pixels according to an embodiment.

As described above, the first scan signal GBi is applied plural times to the 1i-th scan line S1*i* during one frame period FP. The one frame period FP includes an active period ACTP and a blank period BLKP, and the first scan signal GBi is applied to the 1i-th scan line S1*i* in the active period ACTP and the blank period BLKP. The first transistor M1 is periodically in the on-bias state in response to the first scan signal GBi so that degradation of the first transistor M1 can be prevented. In addition, the light emitting element LD is periodically initialized in response to the first scan signal GBi so that unintended fine emission, etc. can be prevented FIG. 6 is a timing diagram illustrating an example of signals supplied to a plurality of pixels according to an embodiment. For convenience of description, only emission control signals EM1 to EMn, fourth scan signals GW1 to GWn, and first scan signals GB1 to GBn are illustrated. In addition, it is illustrated that the first scan signals GB1 to GBn are provided once in a non-emission period (e.g., a period in which a corresponding emission control signal among the emission control signals EM1 to EMn has a logic high level).

Referring to FIGS. 4, 5B, and 6, each of the emission control signals EM1 to EMn may be identical to the emission control signal EMi described with reference to FIGS. 4 and 5B, each of the fourth scan signals GW1 to GWn may be identical to the fourth scan signal GWi described with reference to FIGS. 4 and 5B, and each of the first scan signals GB1 to GBn may be substantially identical or similar to the first scan signal GBi described with reference to FIGS. 4 and 5B. Therefore, overlapping descriptions will not be repeated.

The frame period FP may be defined by a vertical synchronization signal Vsync. The vertical synchronization signal Vsync may be included in the synchronization signal Sync described with reference to FIG. 1.

A data signal Vdata represents a data signal applied to a specific data line. For example, the data signal Vdata may represent the data signal applied to the j-th data line Dj described with reference to FIGS. 1 and 3. The data signal Vdata may have voltage levels corresponding to grayscale values of pixels connected to the j-th data line among image data RGB. As an example, in a period between a first time t1 and a second time t2, the data signal Vdata has a value (or voltage level) corresponding to a first luminance (e.g., a black grayscale BLACK). In the other period, the data signal Vdata may have a value corresponding to a second luminance (e.g., a white grayscale WHITE).

The emission control signals EM1 to EMn may be sequentially provided to the emission control lines E1 to En along a scan direction DR_S. Each of the emission control signals EM1 to EMn may be provided four times during one frame period FP, but embodiments are not limited thereto.

The fourth scan signals GW1 to GWn may also be sequentially provided to the fourth scan lines S41 to S4*n* along the scan direction DR_S. Each of the fourth scan signals GW1 to GWn may be provided once during one frame period FP. As described with reference to FIG. 5B, each of the fourth scan signals GW1 to GWn may be provided in the first non-emission period NEP1 of the active period ACTP.

The first scan signals GB1 to GBn may also be sequentially provided to the first scan lines S11 to Sin along the scan direction DR_S. Each of the first scan signals GB1 to GBn may be provided twice during one frame period FP. For example, the scan driver 200 (see FIG. 1) may provide, twice, a first scan signal corresponding to each of the pixels in the display panel 100 (see FIG. 1). For example, a first pulse PLS1 of each of the first scan signals GB1 to GBn may be provided in the first non-emission period NEP1 of the active period ACTP shown in FIG. 5B, and a second pulse PLS2 of each of the first scan signals GB1 to GBn may be provided in the second non-emission period NEP2 of the blank period BLKP shown in FIG. 5B. A time interval W3 between a time at which the second pulse PLS2 is generated and a time at which the first pulse PLS1 is generated may correspond to a half of the frame period FP.

Since each of the first scan signals GB1 to GBn is provided twice during one frame period FP, some of the first scan signals GB1 to GBn may overlap with each other. For example, at a time at which the second pulse PLS2 of a first scan signal GB1 is applied to an 11-th scan line S11, the first pulse PLS1 of a first scan signal may be applied to an arbitrary first scan line between the 11-th scan line S11 and a 1n-th scan line S1*n*.

In addition, the second pulse PLS2 of at least some of the first scan signals GB1 to GBn may overlap with the fourth scan signals GW1 to GWn. For instance, while the data signal Vdata is written to some of the pixels in response to the fourth scan signals GW1 to GWn, the light emitting element LD (see FIG. 3) of each of another some of the pixels may be initialized in response to the first scan signals GB1 to GBn. For example, in the period between the first time t1 and the second time t2, a data signal Vdata corresponding to the black grayscale BLACK may be written to some of the pixels, and the light emitting element LD of each of another some of the pixels may be initialized.

A change in the data signal Vdata may have influence on pixels connected to a data line to which the data signal Vdata is applied (e.g., a voltage at the first electrode of the light emitting element of the pixel). Some pixels (e.g., first pixels) in which the light emitting element LD is initialized in a period in which the data signal Vdata is changed may emit light differently from other pixels (e.g., second pixels in which the light emitting element LD is not initialized while being disposed in an area adjacent to the first pixels) without receiving the influence. For example, a luminance of the first pixels may become different from that of the second pixels with respect to the same data signal Vdata (e.g., the white grayscale WHITE) recorded therein.

Figure 7:
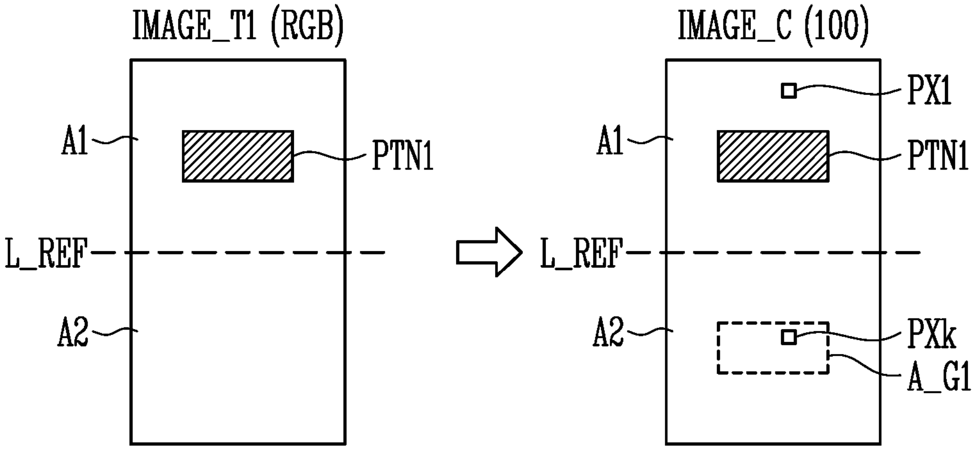
FIG. 7 is a diagram illustrating a comparative example of an image displayed on a display panel included in the display device shown in FIG. 1 according to an embodiment.
Figure 8:
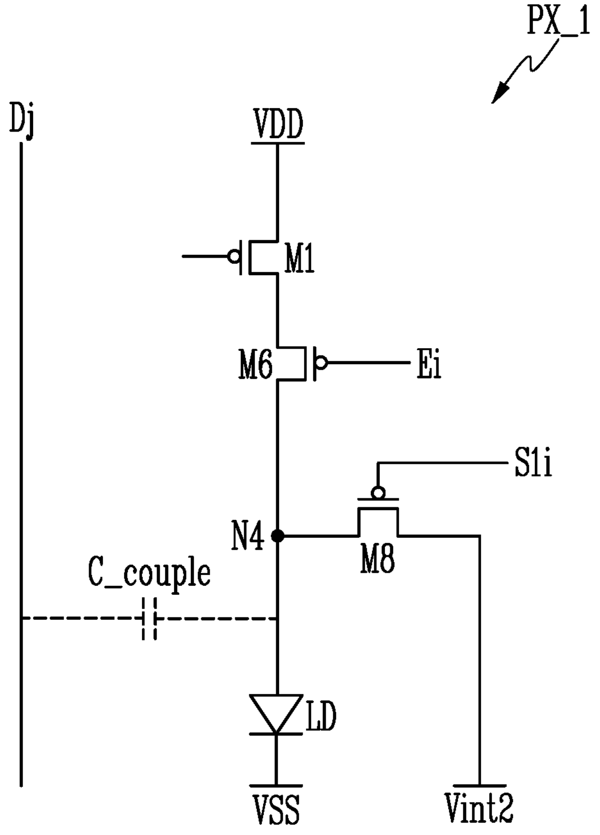
FIG. 8 is a circuit diagram illustrating another example of the pixel included in the display device shown in FIG. 1 according to an embodiment.

FIG. 7 is a diagram illustrating a comparative example of an image displayed on the display panel included in the display device shown in FIG. 1 according to an embodiment. FIG. 8 is a circuit diagram illustrating another example of the pixel included in the display device shown in FIG. 1 according to an embodiment. In FIG. 8, only a partial configuration of the pixel PX shown in FIG. 3 is briefly illustrated for convenience of description of a parasitic capacitor C_couple.

First, referring to FIGS. 6 and 7, a first target image IMAGE_T1 to be displayed on the display panel 100 may include a first pattern PTN1 having a large luminance change. For example, the first pattern PTN1 may correspond to the black grayscale BLACK (or minimum grayscale), and correspond to the period between the first time t1 and the second time t2, shown in FIG. 6. The other area of the first target image IMAGE_T1 except the first pattern PTN1 may correspond to the white grayscale WHITE (or maximum grayscale).

When the display panel 100 displays an image based on image data RGB corresponding to the first target image IMAGE_T1 (and data signal Vdata generated based thereon) in accordance with the comparative example, a display image IMAGE_C displayed on the display panel 100 may further include an unwanted image (or afterimage) (hereinafter, referred to as a "ghost image"). That is, the ghost image may be generated.

As described with reference to FIG. 6, in response to each of the first scan signals GB1 to GBn being provided twice during one frame period PF, the display image IMAGE_C (and a target image IMAGE_T) may be divided into a first area A1 and a second area A2 along the scan direction with respect to a reference line L_REF, and a ghost image may be generated in a partial area A_G1 of the second area A2 corresponding to the first pattern PTN1 of the first area A1. The first area A1 and the second area A2 may have the same area, and the ghost image may have a shape shifted by a half of a length of the display panel 100 along the scan direction (or a length of the first area A1 in the scan direction) from the first pattern PTN1.

Referring to FIGS. 3, 6, 7, and 8, the parasitic capacitor C_couple may be formed or exist between the j-th data line Dj and the first electrode of the light emitting element LD (or the fourth node N4). For example, the j-th data line Dj may be disposed while crossing pixels to be connected to the pixels. For instance, the j-th data line Dj may be disposed while being adjacent to or partially overlapping with a first electrode (or anode electrode) of a pixel PX_1, and accordingly, the parasitic capacitor C_couple may be formed between the j-th data line and the first electrode of the light emitting element LD. Since the j-th data line Dj and the first electrode of the light emitting element LD are capacitor-coupled through the parasitic capacitor C_couple, a voltage at the first electrode of the light emitting element LD (e.g., a node voltage of the fourth node N4) may be changed by the change in data signal Vdata applied to the j-th data line Dj.

In FIG. 7, a first pixel PX1 corresponding to the first area A1 is influenced by the first pattern PTN1, but a k-th pixel PXk corresponding to the partial area A_G1 of the second area A2 may not be influenced by the first pattern PTN1 due to an initialization operation of the light emitting element LD (where k is an integer greater than 1). The k-th pixel PXk that is not influenced by the first pattern PNT1 emits light with a luminance different from that of the first pixel PX1 (e.g., a pixel connected to the same data line as the k-th pixel PXk), and a ghost image may be displayed in only the partial area A_G1 of the second area A2, which corresponds to the k-th pixel PXk.

A relationship between a change in voltage at the first electrode of the light emitting element LD due to the change in data signal Vdata and a first scan signal (e.g., a scan signal applied to the 1i-th scan line S1*i* or an initialization operation of the light emitting element LD) will be described with reference to FIG. 9.

Figure 9:
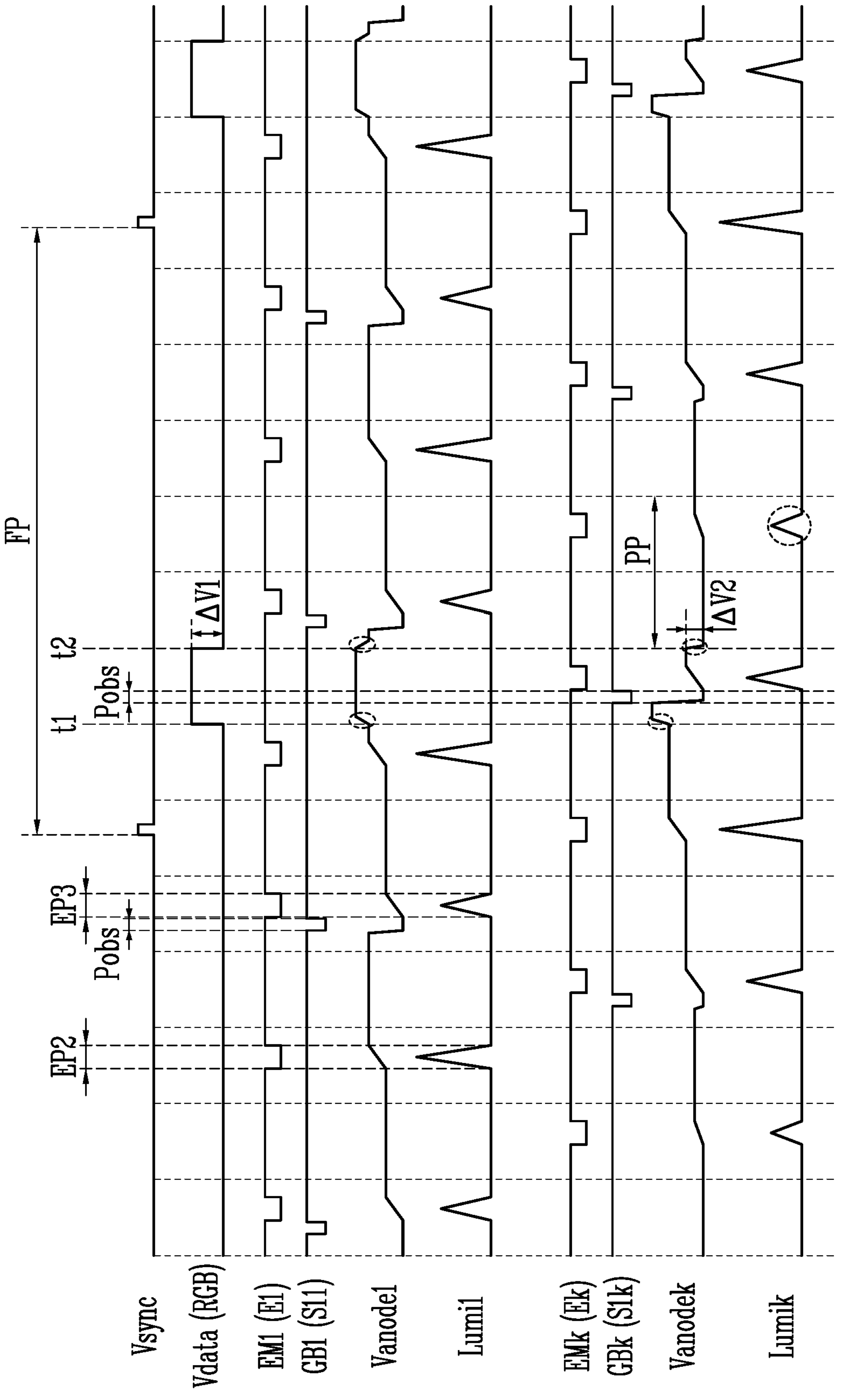
FIG. 9 is a timing diagram illustrating an example of signals measured in a first pixel corresponding to a first area shown in FIG. 7 and a k-th pixel corresponding to a second area shown in FIG. 7 according to an embodiment.

FIG. 9 is a timing diagram illustrating an example of signals measured in the first pixel corresponding to the first area shown in FIG. 7 and the k-th pixel corresponding to the second area shown in FIG. 7 according to an embodiment.

Referring to FIGS. 1 and 6 to 9, a first emission control signal EM1 may be supplied to the first pixel PX1 through a first emission control line E1, and the first scan signal GB1 (or a 1i-th scan signal) may be provided to the first pixel PX1 through the 11-th scan line S11. A first electrode voltage Vanode1 may be a voltage measured at a first electrode of a light emitting element LD of the first pixel PX1 (e.g., a fourth node N4), and a first luminance Lumi1 may represent a luminance of the first pixel PX1. A k-th emission control signal EMk may be provided to the k-th pixel PXk through a k-th emission control line Ek, and a first scan signal GBk (or a 1k-th scan signal) may be provided to the k-th pixel PXk through a 1k-th scan line Slk. A k-th electrode voltage Vanodek may be a voltage measured at a first electrode of a light emitting element LD of the k-th pixel PXk (or a fourth node N4), and a k-th luminance Lumik may represent a luminance of the k-th pixel PXk.

The first emission control signal EM1 and the k-th emission control signal EMk are identical or similar to some of the first emission control signals EM1 to EMn described with reference to FIG. 6, and the first scan signals GB1 and GBk are identical or similar to some of the first scan signals GB1 to GBn described with reference to FIG. 6.

As the first pixel PX1 emits light in response to the first emission control signal EM1, the first electrode voltage Vanode1 may increase in a stepwise manner, and be initialized by the second initialization power source Vint2 (see FIG. 8) in response to the first scan signal GB1. For example, as the first pixel PX1 emits light in a second emission period EP2, the first electrode voltage Vanode1 may increase while a parasitic capacitor of the light emitting element LD of the first pixel PX1 is charged. In a non-emission period (e.g., from an end time of the second emission period EP2 to a start time of a third emission period EP3), the first electrode voltage Vanode1 may be maintained roughly constantly. In an initialization period Pobs (or bias period), the first electrode of the light emitting element LD of the first pixel PX1 may be connected to the second initialization power source Vint2 in response to the first scan signal GB1 having a gate-on voltage, and the first electrode voltage Vanode1 may be initialized. Subsequently, as the first pixel PX1 emits light in the third emission period EP3, the first electrode voltage Vanode1 may increase. Since the first electrode voltage Vanode1 is in an initialized state in the initialization period Pobs, e.g., since the first electrode voltage Vanode1 in the third emission period EP3 is relatively lower than the first electrode voltage Vanode1 in the second emission period EP2, the first luminance Lumi1 in the third emission period EP3 may be relatively lower than the first luminance Lumi1 in the second emission period EP2.

A data signal Vdata at a first time t1 and a second time t2 may be considerably changed. As described with reference to FIG. 6, in a period between the first time t1 and the second time t2, the data signal Vdata may have a value (or voltage level) corresponding to a first luminance (e.g., a black grayscale BLACK). In the other period, the data signal Vdata may have a value corresponding to a second luminance (e.g., a white grayscale WHITE).

At the first time t1, the first electrode voltage Vanode1 may increase by a specific value (e.g., ΔV2), corresponding to a change in the data signal Vdata (e.g., an increase by ΔV1) due to capacitor-coupling of the parasitic capacitor C_couple (see FIG. 8). Subsequently, at the second time t2, the first electrode voltage Vanode1 may decrease by a specific value (e.g., ΔV2), corresponding to a change in the data signal Vdata (e.g., a decrease by ΔV1). For instance, the first electrode voltage Vanode1 after the second time t2 may return to the first electrode voltage Vanode1 before the first time t1.

The k-th electrode voltage Vanodek may have a waveform similar to that of the first electrode voltage Vanode1.

At the first time t1, the k-th electrode voltage Vanodek may increase by a specific value (e.g., ΔV2), corresponding to a change in the data signal Vdata (e.g., an increase by ΔV1) due to the capacitor-coupling of the parasitic capacitor C_couple. Subsequently, in the initialization period Pobs between the first time t1 and the second time t2, the first electrode of the light emitting element LD of the k-th pixel PXk may be connected to the second initialization power source Vint2 in response to the first scan signal GBk having the gate-on voltage, and the k-th electrode voltage Vanodek may be initialized.

After the initialization period Pobs, the k-th electrode voltage Vanodek may increase as the k-th pixel PXk emits light in response to the k-th emission control signal EMk.

Subsequently, at the second time t2, the k-th electrode voltage Vanodek may decrease by a specific value (e.g., ΔV2), corresponding to a change in the data signal Vdata (e.g., a decrease by ΔV1). The k-th electrode voltage Vanodek after the second time t2 may have a voltage level similar to that of the second initialization power source Vint2.

Until before the k-th emission control signal EMk having the gate-on voltage is applied, e.g., during an abnormal period PP, the k-th electrode voltage Vanodek may be maintained as a relatively low value. The k-th luminance Lumik may be relatively low in the abnormal period PP. For example, the k-th luminance Lumik in the abnormal period PP may be lower than the first luminance Lumi1 in a second emission period EP2 corresponding thereto, and may be lower than the k-th luminance Lumik between the first time t1 and the second time t2. The k-th luminance Lumik in the abnormal period PP can lower an average luminance of the k-th pixel PXk during one frame period FP.

Similarly to the k-th pixel PXk, pixels receiving the first scan signal in the period between the first time t1 and the second time t2, e.g., pixels corresponding to the partial area A_G1 of the second area A2 shown in FIG. 7 may emit light with a luminance relatively lower than that of other pixels with respect to the same grayscale value, and a ghost image may be displayed in the partial area A_G1 of the second area A2.

Therefore, the data compensator 700 (see FIG. 1) in accordance with various embodiments may sense a pattern (e.g., the first pattern PTN1) in which a grayscale change considerably occurs in image data RGB, and compensate for grayscale values with respect to an area (e.g., the partial area A_G1 of the second area) in which an unwanted luminance change is to occur due to the pattern. For example, the data compensator 700 may compensate for a grayscale value of pixels receiving the first scan signals GB1 and GBk while the data signal Vdata corresponding to the first pattern PTN1 is provided to the display panel 100. A change in voltage at the first electrode of the light emitting element LD due to the parasitic capacitor C_couple and the first pattern PTN1 may be compensated. Thus, the pixels (e.g., the pixels corresponding to the partial area A_G1) can emit light with the same luminance as other pixels (e.g., pixels adjacent to the partial area A_G1), and a ghost image (or luminance deviation) can be removed.

Figure 10:
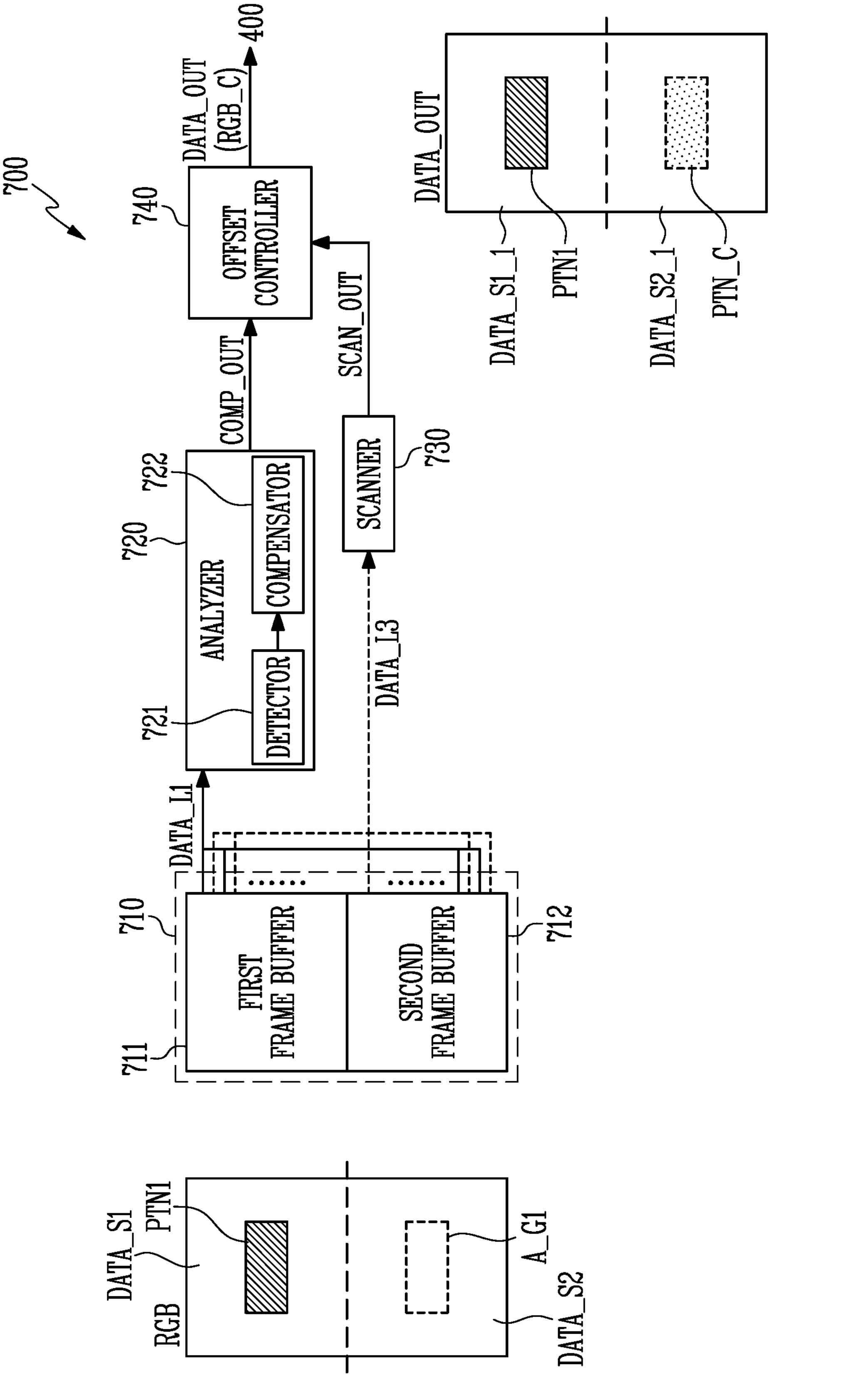
FIG. 10 is a diagram illustrating an example of a data compensator included in the display device shown in FIG. 1 according to an embodiment.

FIG. 10 is a diagram illustrating an example of the data compensator included in the display device shown in FIG. 1 according to an embodiment. FIG. 11 is a diagram illustrating an example of an analyzer included in the data compensator shown in FIG. 10 according to an embodiment.

First, in FIGS. 1, 3, and 6 to 10, the data compensator 700 may include a buffer unit 710 (or buffer block), an analyzer 720 (or analysis block), a scanner 730 (or a scan block), and an offset controller 740 (or offset control block). Hereinafter, a case where the output frequency of the first scan signals GB1 to GBn described with reference to FIG. 6 is two times the frame frequency is described. For example, each of the first scan signals GB to GBn may be provided twice during one frame period FP.

The buffer unit 710 may store image data RGB. For example, the buffer unit 710 may store frame data corresponding to the one frame period FP.

In an embodiment, the buffer unit 710 may include a first frame buffer 711 and a second frame buffer 712. Each of the first frame buffer 711 and the second frame buffer 712 may store half frame data corresponding to a half of one frame data. For example, one of the first frame buffer 711 and the second frame buffer 712 may store current half frame data input at a current time, and the other of the first frame buffer 711 and the second frame buffer 712 may store previous half frame data input just before the current time. For example, when the image data RGB (or one frame data) includes first sub-data DATA_S1 (e.g., half frame data corresponding to the first area A1 shown in FIG. 7) and second sub-data DATA_S2 (e.g., half frame data corresponding to the second area A2 shown in FIG. 7), which are distinguished from each other according to a scan order, the first frame buffer 711 may store the second sub-data DATA_S2, and the second frame buffer 712 may store the first sub-data DATA_S1. Alternatively, the first frame buffer 711 may store the first sub-data DATA_S1, and the second frame buffer 712 may store the second sub-data DATA_S2. Hereinafter, it is assumed that the first sub-data DATA_S1 is previous half frame data and the second sub-data DATA_S2 is current half frame data. Also, it is assumed that the first sub-data DATA_S1 includes a first pattern PTN1 having a large luminance change.

The analyzer 720 may detect the first pattern PTN1 by comparing two adjacent line data among the previous half frame data, and calculate compensation values COMP_OUT corresponding to the first pattern PTN1.

For example, the analyzer 720 may include a detector 721 (or detection block or detection circuit) and a compensator 722 (or compensation block or compensation circuit). The detector 721 may determine whether a difference between adjacent grayscale values is greater than a reference value by comparing first line data DATA_L1 (or current line data) with second line data DATA_L2 (or previous line data) adjacent to the first line data DATA_L1, and the compensator 722 may calculate the compensation values COMP_OUT based on a parameter predetermined based on the reference value and the first line data DATA_L1.

Figure 11:
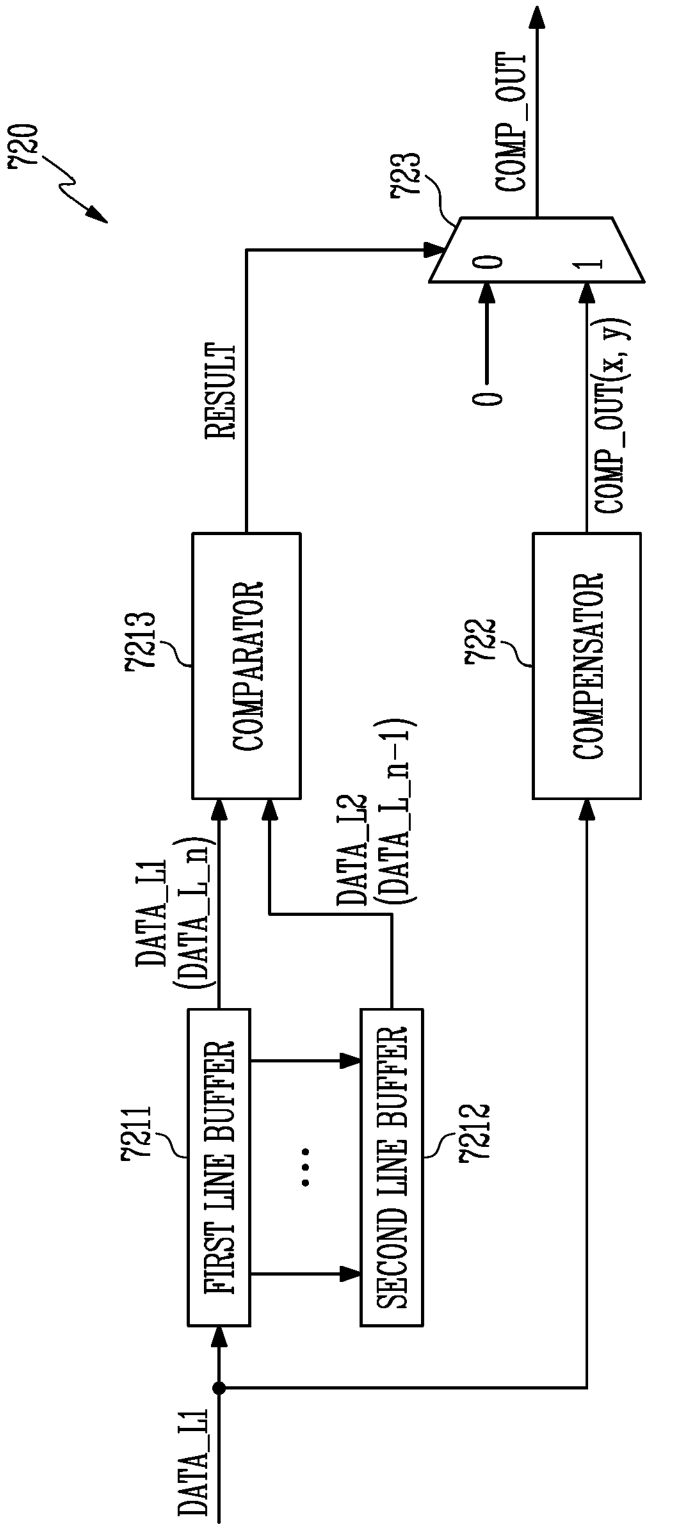
FIG. 11 is a diagram illustrating an example of an analyzer included in the data compensator shown in FIG. 10 according to an embodiment.

Referring to FIG. 11, the detector 721 may include a first line buffer 7211, a second line buffer 7212, and a comparator 7213 (or comparison circuit).

The first line buffer 7211 may receive and store the first line data DATA_L1 from the buffer unit 710 (or the first sub-data DATA_S1), and the second line buffer 7212 may receive and store the second line data DATA_L2 (e.g., line data stored in the first line buffer 7211 at a previous time) from the first line buffer 7211. For example, the second line buffer 7212 may store (n−1)-th line data DATA_L_n−1, and the first line buffer 7211 may store n-th line data DATA_L_n. However, embodiments are not limited thereto, and the first line buffer 7211 and the second line buffer 7212 may alternately receive and store the first line data DATA_L1 (or current line data).

The comparator 7213 may compare an output of the first line buffer 7211 with corresponding grayscale values of the second line buffer 7212, and output a comparison result RESULT by comparing a difference between the grayscale values with the reference value. For example, the comparator 7213 may compare corresponding grayscale values of the first line data DATA_L1 and the second line data DATA_L2 (e.g., grayscale values corresponding to pixels connected to the same data line), and determine whether a difference between the grayscale values is greater than the reference value. When the difference between the grayscale values is greater than or equal to the reference value, the comparator 7213 may output the comparison result RESULT having a first value (e.g., a value of 1). When the difference between the grayscale values is smaller than the reference value, the comparator 7213 may output the comparison result RESULT having a second value (e.g., a value of 0). The comparison result RESULT may be a data signal of 1 bit, but embodiments are not limited thereto.

In some embodiments, the comparison result RESULT may be provided to the first line buffer 7211, and the first line buffer 7211 may provide the second line buffer 7212 with the previous line data (e.g., the line data stored in the first line buffer 7211 at the previous time) based on the comparison result RESULT. For example, the first line buffer 7211 may provide a grayscale value of the previous line data to the second line buffer 7212 based on the comparison result RESULT having the second value (e.g., the value of 0). In another example, the first line buffer 7211 may not provide the grayscale value of the previous line data to the second line buffer 7212 based on the comparison result RESULT having the first value (e.g., the value of 1). At least some of the grayscale values of the second line data DATA_L2 of the second line buffer 7212 may not be updated, and the second line buffer 7212 may output the second line data DATA_L2 having a grayscale value (or reference grayscale value) just before a large grayscale change occurs. The comparator 7213 determines a grayscale change with respect to the reference grayscale value, and therefore, all grayscale values corresponding to the first pattern PTN1 may be detected.

The compensator 722 may calculate a compensation value COMP_OUT(x, y) of each of the grayscale values included in the first line data DATA_L1 based on the parameter (or compensation parameter) predetermined corresponding to the reference value and the first line data DATA_L1. For example, the parameter may include a gain and an offset, and the gain and/or the offset may become larger as the reference value becomes larger.

For example, the compensator 722 may scale a grayscale value included in the first line data DATA_L1 based on the gain, and calculate a compensation value COMP_OUT(x, y) corresponding to the grayscale value by adding the offset to the scaled grayscale value (e.g., "compensation value=(grayscale value×gain)+offset").

The compensator 722 may calculate the compensation value COMP_OUT(x, y) independently from an operation (or the comparison result RESULT) of the comparator 7213. However, embodiments are not limited thereto. For example, the compensator 722 may calculate compensation values in response to the comparison result RESULT (e.g., the first value). When the compensation value calculation operation of the compensator 722 is simultaneously performed with the comparison operation of the comparator 7213, the compensation values COMP_OUT are output more rapidly as compared with a case where the comparator 7213 and the compensator 722 are sequentially operated, and compensation for grayscale values can be made more in real time.

In some embodiments, the analyzer 720 (or the data compensator 700) may further include a decoder 723.

The decoder 723 may select a reference compensation value or the compensation value COMP_OUT(x, y) of the compensator 722 based on the comparison result RESULT, and output the selected compensation value as the compensation values COMP_OUT. For example, the reference compensation value may be 0. For example, when the comparison result RESULT is the first value, the compensation value COMP_OUT(x, y) may be output corresponding to that the grayscale change is large. When the comparison result RESULT is the second value, the compensation values of 0 may be output corresponding to that the grayscale change is not large.

Referring back to FIG. 10, the scanner 730 may read third line data DATA_L3 corresponding to the first line data DATA_L1 from the current half frame data. The third line data DATA_L3 may correspond to a pixel (or pixels) that receives the first scan signal (e.g., GBi) while a data signal Vdata corresponding to the first line data DATA_L1 is provided to the display panel 100 (see FIG. 1). For instance, the scanner 730 may read data (or grayscale values) of the partial area A_G1 in which a luminance change is predicted corresponding to the first pattern PTN1.

For example, a position difference between the first line data DATA_L1 and the third line data DATA_L3 in the image data RGB (or frame data) may correspond to about a half of the one frame period FP.

The offset controller 740 may generate compensated grayscale values DATA_OUT (e.g., compensated image data RGB_C) by respectively adding the compensation values COMP_OUT (e.g., compensation values corresponding to the first line data DATA_L1) to output grayscale values SCAN_OUT output from the scanner 730 (e.g., grayscale values included in the third line data DATA_L3 corresponding to the first line data DATA_L1).

The compensated image data RGB_C may include a compensation pattern PTN_C corresponding to the first pattern PTN1. For example, the compensated image data RGB_C may include first sub-data DATA_S1_1 (or first sub-compensated data) and second sub-data DATA_S2_1 (or second sub-compensated data). The first sub-data DATA_S1_1 may include the first pattern PTN1, and the second sub-data DATA_S2_1 may include the compensation pattern PTN_C. The compensation pattern PTN_C may have the same shape and area as the first pattern PTN1, and may be located to be spaced apart from the first pattern PTN1 in the scan direction.

When the first pattern PTN1 includes grayscale values (e.g., a black grayscale) lower than adjacent areas, the compensation pattern PTN_C may include grayscale values higher than adjacent areas. Alternatively, when the first pattern PTN1 includes grayscale values (e.g., a white grayscale) higher than adjacent areas, the compensation pattern PTN_C may include grayscale values lower than adjacent areas.

In some embodiments, the offset controller 740 may scale the output grayscale values SCAN_OUT or the compensated grayscale values DATA_OUT, which are output from the scanner 730, by considering the range of a grayscale value.

The data driver 400 (see FIG. 1) may generate data signal Vdata based on the compensated image data RGB_C, and pixels corresponding to the compensation pattern PTN_C may emit light with a compensated luminance. Therefore, a ghost image may not be generated or be viewed by a user in the partial area A_G1.

As described above, the data compensator 700 detects the first pattern PTN1 in which a large grayscale change occurs in the image data RGB, calculates compensation values corresponding to the first pattern PTN1, reads grayscale values of the partial area A_G1 in which an unwanted luminance change is to occur due to the first pattern PTN1, and compensates for the read grayscale values using the compensation values. For instance, the data compensator 700 detects the first pattern PTN1 and compensates the image data RGB based on the first pattern PTN1 so that the compensated image data RGB_C including the compensation pattern PTN_C can be generated. The pixels of the partial area A_G1 emit light with a compensated luminance corresponding to the compensation pattern PTN_C, and therefore, a ghost image may not be generated in the partial area A_G1.

Although a case where the data compensator 700 compensates for current half frame data by analyzing previous half frame data has been described in FIG. 10, embodiments are not limited thereto. In some embodiments, the data compensator 700 may compensate for the current half frame data by analyzing next half frame data.

Figure 12:
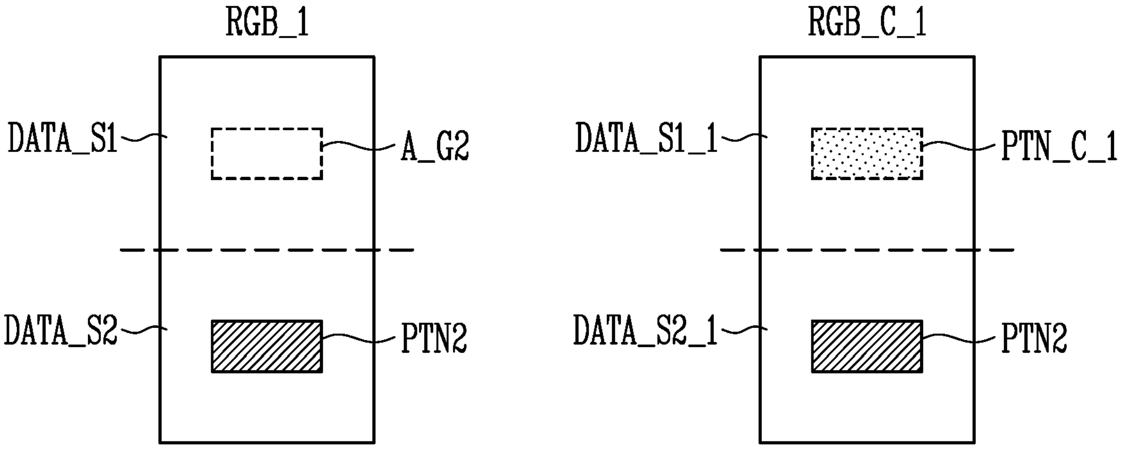
FIG. 12 is a diagram illustrating an example of compensated image data generated in the compensator shown in FIG. 10 according to an embodiment.

FIG. 12 is a diagram illustrating an example of the compensated image data generated in the compensator shown in FIG. 10 according to an embodiment.

Referring to FIGS. 1 and 7 to 12, image data RGB_1 (or one frame data) may include first sub-data DATA_S1 (e.g., half frame data corresponding to the first area A1 shown in FIG. 7) and second sub-data DATA_S2 (e.g., half frame data corresponding to the second area A2 shown in FIG. 7), which are distinguished from each other according to a scan order. In addition, the first sub-data DATA_S1 may be previous half frame data, and the second sub-data DATA_S2 may be current half frame data.

It is assumed that the second sub-data DATA_S2 includes a second pattern PTN2 having a large luminance change.

The data compensator 700 may detect the second pattern PTN2 from the image data RGB_1 (e.g., the second sub-data DATA_S2), calculate compensated values corresponding to the second pattern PTN2, read grayscale values of a partial area A_G2 in which an unwanted luminance change is to occur due to the second pattern PTN2, and compensate for the read grayscale values using the compensation values. For example, the data compensator 700 detects the second pattern PTN2 and compensates for the image data RGB_1 based on the second pattern PTN2 so that compensated image data RGB_C_1 including a compensation pattern PTN_C_1 can be generated. For example, the compensation pattern PTN_C_1 may include first sub-data DATA_S1_1 and second sub-data DATA_S2_1. The second sub-data DATA_S2_1 may include the second pattern PTN2, and the first sub-data DATA_S1_1 may include the compensation pattern PTN_C_1.

The data driver 400 (see FIG. 1) may generate a data signal Vdata based on the compensated image data RGB_C_1, and pixels corresponding to the compensation pattern PTN_C (and the partial area A_G2) may emit light with a compensated luminance. Therefore, a ghost image may not be generated or be viewed by a user in the partial area A_G2.

Figure 13:
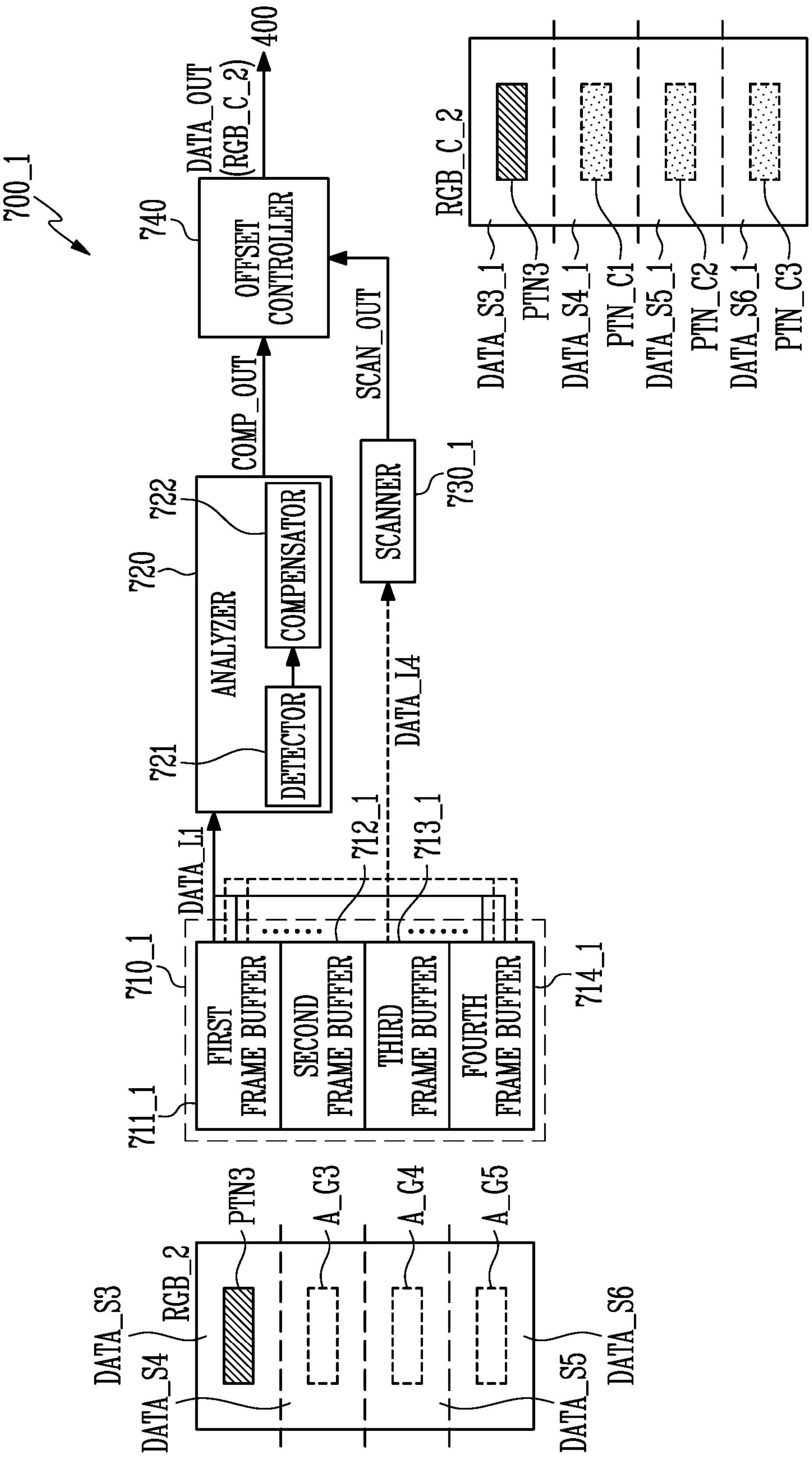
FIG. 13 is a diagram illustrating another example of the data compensator included in the display device shown in FIG. 1 according to an embodiment.

FIG. 13 is a diagram illustrating another example of the data compensator included in the display device shown in FIG. 1 according to an embodiment. In FIG. 13, a drawing corresponding to FIG. 10 is illustrated.

Referring to FIGS. 1, 3, 6 to 11, and 13, a data compensator 700_1 may include a buffer unit 710_1 (or buffer block), an analyzer 720 (or analysis block), a scanner 730_1 (or scan block), and an offset controller 740 (or offset control block). The buffer unit 710_1, the analyzer 720, the scanner 730_1, and the offset controller 740 may be substantially identical or similar to the buffer unit 710, the analyzer 720, the scanner 730, and the offset controller 740, which are described with reference to FIG. 10, respectively. Therefore, overlapping descriptions will not be repeated.

Hereinafter, as described with reference to FIG. 5A, a case where the output frequency of the first scan signal GBi is four times of the frame frequency is described.

The buffer unit 710_1 may store image data RGB_2.

In an embodiment, the buffer unit 710_1 may include a first frame buffer 711_1, a second frame buffer 712_1, a third frame buffer 713_1, and a fourth frame buffer 714_1. Each of the first to fourth frame buffers 711_1 to 714_1 may store quarter frame data corresponding to ¼ of one frame data. For example, when the image data RGB_2 (or one frame data) includes third sub-data DATA_S3, fourth sub-data DATA_S4, fifth sub-data DATA_S5, and sixth sub-data DATA_S6, which are distinguished from each other according to a scan order, the first to fourth frame buffers 711_1 to 714_1 may respectively store the third to sixth sub-data DATA_S3 to DATA_S6. Hereinafter, it is assumed that the third sub-data DATA_S3 is previous quarter frame data and each of the fourth to sixth sub-data DATA_S4 to DATA_S6 is current quarter frame data. Also, it is assumed that the third sub-data DATA_S3 includes a third pattern PTN3 having a large luminance change.

The analyzer 720 may detect the third pattern PTN3 by comparing two adjacent line data among the previous quarter frame data (e.g., the third sub-data DATA_S3), and calculate compensation values COMP_OUT corresponding to the third pattern PTN3. As described with reference to FIG. 10, the analyzer 720 may determine whether a difference between adjacent grayscale values is greater than a reference value by comparing first line data DATA_L1 (or current line data) with second line data DATA_L2 (or previous line data) adjacent to the first line data DATA_L1, and calculate the compensation values COMP_OUT based on a parameter predetermined based on the reference value and the first line data DATA_L1.

The scanner 730_1 may read fourth line data DATA_L4 corresponding to the first line data DATA_L1 from each of the current quarter frame data (e.g., the fourth to sixth sub-data DATA_S4 to DATA_S6). The fourth line data DATA_LA may correspond to a pixel (or pixels) which receives the first scan signal (e.g., GBi) while a data signal Vdata corresponding to the first line data DATA_L1 is provided to the display panel 100 (see FIG. 1). For instance, the scanner 730_1 may read data (or grayscale values) of partial areas A_G3, A_G4, and A_G5 in which a luminance change is predicted corresponding to the third pattern PTN3.

The offset controller 740 may generate compensated grayscale values DATA_OUT (e.g., compensated image data RGB_C_2) by respectively adding the compensation values COMP_OUT (e.g., compensation values corresponding to the first line data DATA_L1) to output grayscale values SCAN_OUT output from the scanner 730_1 (e.g., grayscale values included in the fourth line data DATA_L4 corresponding to the first line data DATA_L1).

The compensated image data RGB_C_2 may include first, second, and third compensation patterns PTN_C1, PTN_C2, and PTN_C3 corresponding to the first pattern PTN1. For example, the compensated image data RGB_C_2 may include third sub-data DATA_S3_1, fourth sub-data DATA_S4_1, fifth sub-data DATA_S5_1, and sixth sub-data DATA_S6_1. The third sub-data DATA_S3_1 may include the third pattern PTN3, the fourth sub-data DATA_S4_1 may include the first compensation pattern PTN_C1, the fifth sub-data DATA_S5_1 may include the second compensation pattern PTN_C2, and the sixth sub-data DATA_S6_1 may include the third compensation pattern PTN_C3. Each of the first to third compensation patterns PTN_C1 to PTN_C3 may have the same shape and area as the first pattern PTN1.

The data driver 400 (see FIG. 1) may generate a data signal Vdata based on the compensated image data RGB_C_2, and pixels corresponding to the first to third compensation patterns PTN_C1 to PTN_C3 may emit light with a compensated luminance. Therefore, a ghost image may not be generated or be viewed by a user in the partial areas A_G3, A_G4, and A_G5.

In association with FIG. 13, it has been described that the image data RGB_2 includes the third to sixth sub-data DATA_S3 to DATA_S6, i.e., four sub-data, by considering that the output frequency of the first scan signal GBi is four times of the frame frequency. However, embodiments are not limited thereto. For example, when the output frequency of the first scan signal GBi is three times of the frame frequency, the image data RGB_2 may include three sub-data. The data compensator 700_1 may compensate for each of the other two sub-data among the three sub-data based on a pattern detected from one of the three sub-data.

According to various embodiments, a display device detects a pattern in which a large grayscale change occurs in previous half frame data, and compensates for current half frame data. The display device compensates for grayscale values of pixels that receive first scan signals (scan signals for controlling one electrode of a light emitting element to be initialized) while a data signal corresponding to the pattern is provided to the display panel. Thus, a parasitic capacitor (e.g., a parasitic capacitor between a data line and the one electrode of the light emitting element) and a change in voltage at the one electrode of the light emitting element due to the pattern can be compensated. Accordingly, a luminance deviation caused by the pattern can be compensated, and the display quality of the display device can be improved.

Although certain embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device comprising:

a display panel comprising a first area and a second area distinguished from each other along a scan direction, each of the first and second areas including pixels;

a scan driver configured to sequentially provide scan signals to the display panel along the scan direction;

a data compensator configured to:

detect a pattern in the first area based on a luminance change on an image displayed on the display panel based on image data; and generate, from the image data, compensated image data by compensating for grayscale values of the image data for a partial area of the second area corresponding to the pattern, wherein the partial area of the second area is located where the pattern in the first area is shifted in the scan direction; and a data driver configured to:

generate data signals based on the compensated image data; and provide the data signals to the display panel, wherein:

the image data comprises first sub-data corresponding to the first area and second sub-data corresponding to the second area; and the data compensator comprises:

a detection circuit configured to detect the pattern by comparing first line data with second line data adjacent to the first line data among the first sub-data;

a compensation circuit configured to determine compensation values based on a parameter corresponding to a reference value and the first line data;

a scan circuit configured to read third line data corresponding to the first line data from the second sub-data; and an offset control circuit configured to generate the compensated image data by respectively adding the compensation values to grayscale values included in the third line data.

2. The display device of claim 1, wherein each of the pixels comprises:

a light emitting diode connected between a first power source and a second power source;

a driving transistor configured to provide a driving current to the light emitting diode in response to a corresponding data signal among the data signals; and a switching transistor configured to connect one electrode of the light emitting diode to an initialization power source in response to a corresponding scan signal among the scan signals.

3. The display device of claim 2, wherein the scan driver is configured to supply, at least twice, the corresponding scan signal to each of the pixels during one frame period.

4. The display device of claim 2, wherein the data compensator is configured to compensate for a grayscale value corresponding to a pixel, which receives the corresponding scan signal, while first data signals corresponding to the pattern are provided from the data driver to the display panel.

5. The display device of claim 4, wherein the data compensator is configured to compensate for the grayscale value such that a change in voltage at the one electrode of the light emitting diode due to the pattern and a parasitic capacitor formed between a data line to which the corresponding data signal is applied and the one electrode of the light emitting diode is compensated.

6. The display device of claim 5, wherein:

the compensated image data comprises:

first sub-compensated data corresponding to the first area; and second sub-compensated data corresponding to the second area; and the second sub-compensated data comprises a compensation pattern corresponding to the pattern of the first sub-compensated data.

7. The display device of claim 6, wherein, in response to the pattern comprising grayscale values lower than grayscale values of another area of the first area, the compensation pattern comprises grayscale values higher than grayscale values of another area of the second area.

8. The display device of claim 6, wherein:

the pattern and the compensation pattern have substantially the same shape and area; and the compensation pattern is spaced apart from the pattern in the scan direction.

9. The display device of claim 2, wherein the first area and the second area are set based on an output frequency at which the corresponding scan signal is output from the scan driver.

10. The display device of claim 1, wherein the compensation circuit is configured to determine the compensation values by scaling grayscale values included in the first line data and adding a non-zero offset value to the scaled grayscale values.

11. The display device of claim 1, wherein a position difference between the third line data and the first line data in the image data corresponds to a half of one frame period.

12. The display device of claim 1, wherein the detection circuit comprises:

a first line buffer configured to store the first line data;

a second line buffer configured to store the second line data applied before the first line data; and a comparator configured to output a comparison result by comparing a difference between an output of the first line buffer and an output of the second line buffer with the reference value.

13. The display device of claim 12, wherein the data compensator further comprises a decoder configured to:

select a reference compensation value or an output value of the compensation circuit based on the comparison result; and output the selected value as the compensation values.

* * * * *